(12) United States Patent
Rippingale et al.

(10) Patent No.: US 7,346,555 B2
(45) Date of Patent: Mar. 18, 2008

(54) METHOD AND APPARATUS FOR CLIENT-IN-CHARGE BUSINESS TRANSACTION PROCESSING

(76) Inventors: Jan Rippingale, 10336 Loch Lomond Rd., #247, Middletown, CA (US) 95461; Susan Pottish, 216 W. perkins, #303, Ukiah, CA (US) 95482

( * ) Notice: Subject to any disclaimer, the term of this patent is extended or adjusted under 35 U.S.C. 154(b) by 630 days.

(21) Appl. No.: 10/607,617

(22) Filed: Jun. 27, 2003

(65) Prior Publication Data

US 2004/0267627 A1  Dec. 30, 2004

(51) Int. Cl.
*G06Q 30/00* (2006.01)
(52) U.S. Cl. .......................................... 705/26; 705/27
(58) Field of Classification Search ............. 705/26–27
See application file for complete search history.

(56) References Cited

U.S. PATENT DOCUMENTS

| | | | |
|---|---|---|---|
| 5,903,881 A * | 5/1999 | Schrader et al. ............... 705/42 |
| 5,905,973 A | 5/1999 | Yonezawa et al. |
| 5,956,709 A | 9/1999 | Xue |
| 5,966,697 A | 10/1999 | Fergerson et al. |
| 6,125,352 A * | 9/2000 | Franklin et al. ............... 705/26 |
| 6,233,682 B1 | 5/2001 | Fritsch |
| 6,246,998 B1 | 6/2001 | Matsumori |
| 6,247,130 B1 | 6/2001 | Fritsch |
| 6,332,163 B1 * | 12/2001 | Bowman-Amuah ......... 709/231 |
| 6,360,206 B1 | 3/2002 | Yamashita et al. |
| 6,466,915 B1 | 10/2002 | Suzuki et al. |
| 6,484,149 B1 | 11/2002 | Jammes et al. |
| 6,535,880 B1 | 3/2003 | Musgrove et al. |
| 6,543,052 B1 | 4/2003 | Ogasawara |
| 2001/0007099 A1 | 7/2001 | Kau et al. |
| 2001/0011239 A1 | 8/2001 | Kondoh et al. |
| 2001/0034658 A1 | 10/2001 | Silva et al. |
| 2001/0042025 A1 | 11/2001 | Yonezawa et al. |
| 2001/0044751 A1 | 11/2001 | Pugliese et al. |
| 2001/0047489 A1 * | 11/2001 | Ito et al. ..................... 713/202 |
| 2001/0049607 A1 | 12/2001 | Tanaka et al. |
| 2001/0051903 A1 | 12/2001 | Hansmann et al. |
| 2001/0054012 A1 | 12/2001 | Nayyar |
| 2002/0004749 A1 * | 1/2002 | Froseth et al. ................ 705/16 |
| 2002/0010654 A1 | 1/2002 | Yonezawa et al. |
| 2002/0013761 A1 * | 1/2002 | Bundy et al. ................. 705/37 |
| 2002/0016716 A1 | 2/2002 | Hong et al. |
| 2002/0022967 A1 | 2/2002 | Ohkado |
| 2002/0023007 A1 | 2/2002 | Lee |

(Continued)

FOREIGN PATENT DOCUMENTS

EP    1118949    *  7/2001

(Continued)

OTHER PUBLICATIONS

White, Ron. "How Computers Work." 2002. Que. Indianapolis, IN. 6th. pp. 223, and 257.*

(Continued)

*Primary Examiner*—Robert M. Pond
(74) *Attorney, Agent, or Firm*—Earle Jennings

(57) ABSTRACT

The method and apparatus of the client-in-charge architecture is based upon a different approach to the problems of server bandwidth and latency, found in the server-heavy architectures, while addressing the problems of requiring client acceptance, found in the client-heavy architectures.

67 Claims, 25 Drawing Sheets

U.S. PATENT DOCUMENTS

| | | | |
|---|---|---|---|
| 2002/0026363 A1* | 2/2002 | Dunway, Jr. ................. | 705/15 |
| 2002/0038255 A1 | 3/2002 | Tarvydas et al. | |
| 2002/0042750 A1 | 4/2002 | Morrison | |
| 2002/0049637 A1 | 4/2002 | Harman et al. | |
| 2002/0055878 A1* | 5/2002 | Burton et al. ................. | 705/26 |
| 2002/0065737 A1 | 5/2002 | Aliabadi et al. | |
| 2002/0065851 A1 | 5/2002 | Watson et al. | |
| 2002/0069114 A1 | 6/2002 | Charette et al. | |
| 2002/0099610 A1 | 7/2002 | Marion | |
| 2002/0111873 A1 | 8/2002 | Ehrlich et al. | |
| 2002/0120553 A1* | 8/2002 | Bowman-Amuah .......... | 705/37 |
| 2002/0128931 A1 | 9/2002 | Himmel et al. | |
| 2002/0131444 A1 | 9/2002 | Moodie et al. | |
| 2002/0133414 A1 | 9/2002 | Pradhan et al. | |
| 2002/0133429 A1 | 9/2002 | Lu | |
| 2002/0133432 A1 | 9/2002 | Yamashita | |
| 2002/0143660 A1 | 10/2002 | Himmel et al. | |
| 2002/0143662 A1* | 10/2002 | Clark et al. ................... | 705/27 |
| 2002/0156685 A1 | 10/2002 | Ehrlich et al. | |
| 2002/0156699 A1 | 10/2002 | Gray et al. | |
| 2002/0158916 A1 | 10/2002 | Gusler et al. | |
| 2002/0161662 A1 | 10/2002 | Bredow et al. | |
| 2002/0161669 A1 | 10/2002 | Kitahara et al. | |
| 2002/0165798 A1* | 11/2002 | Hausmann et al. ........... | 705/26 |
| 2002/0178045 A1* | 11/2002 | Kraft et al. ................... | 705/10 |
| 2002/0194087 A1 | 12/2002 | Spiegel et al. | |
| 2003/0004831 A1 | 1/2003 | Owens | |
| 2003/0018536 A1 | 1/2003 | Eggebraaten et al. | |
| 2003/0018545 A1 | 1/2003 | Yonezawa et al. | |
| 2003/0061284 A1* | 3/2003 | Mandarino et al. ......... | 709/204 |
| 2003/0088483 A1* | 5/2003 | Moyer ......................... | 705/27 |
| 2003/0139976 A1* | 7/2003 | Hanai et al. .................. | 705/26 |
| 2003/0233317 A1* | 12/2003 | Judd ............................ | 705/39 |
| 2004/0054551 A1* | 3/2004 | Ausubel et al. ............... | 705/1 |
| 2004/0059637 A1* | 3/2004 | Jung ............................ | 705/26 |
| 2004/0068443 A1* | 4/2004 | Hopson et al. ............... | 705/26 |

OTHER PUBLICATIONS

Aries, James et al.; "Capacity and performance analysis . . . ," Communications of the ACM, Jun. 2002, Dialog file 275, #02610472, 9pgs.*

* cited by examiner

Fig. 3A
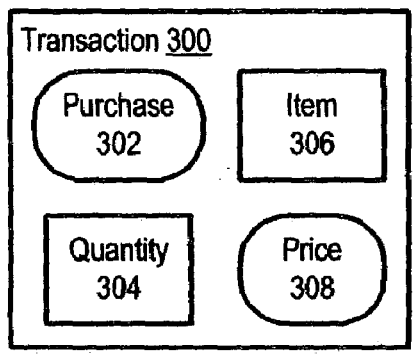
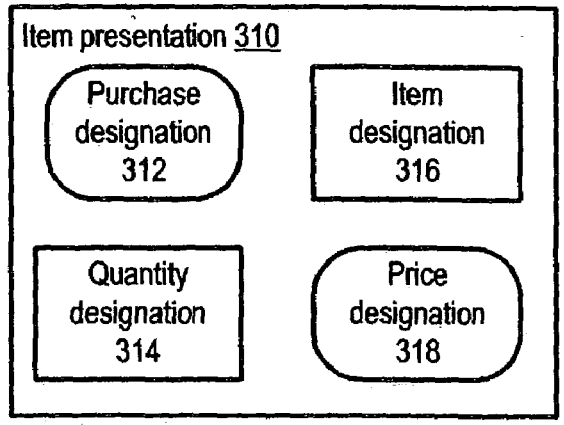
Fig. 3B
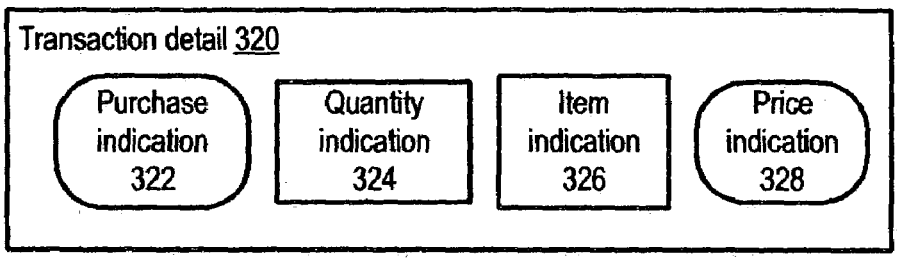
Fig. 3C
Fig. 3D
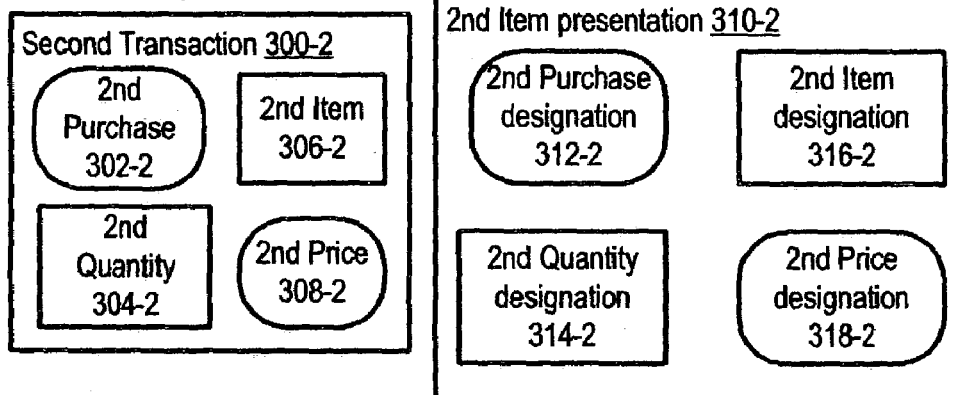
Fig. 3E
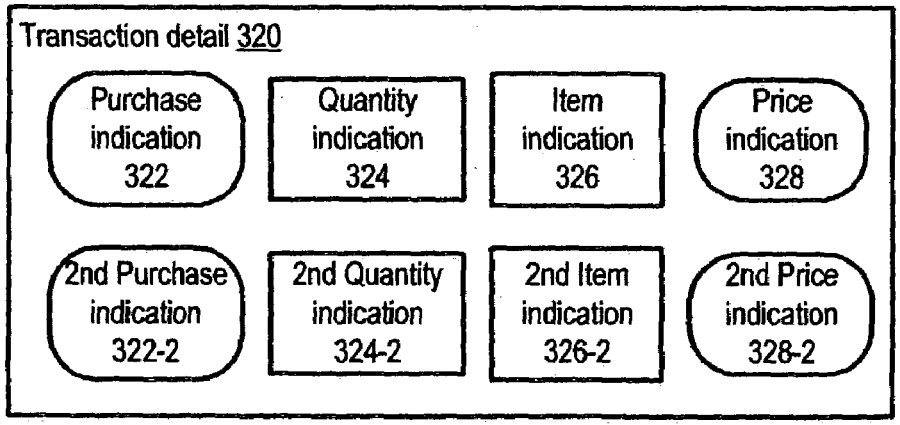
Fig. 3F

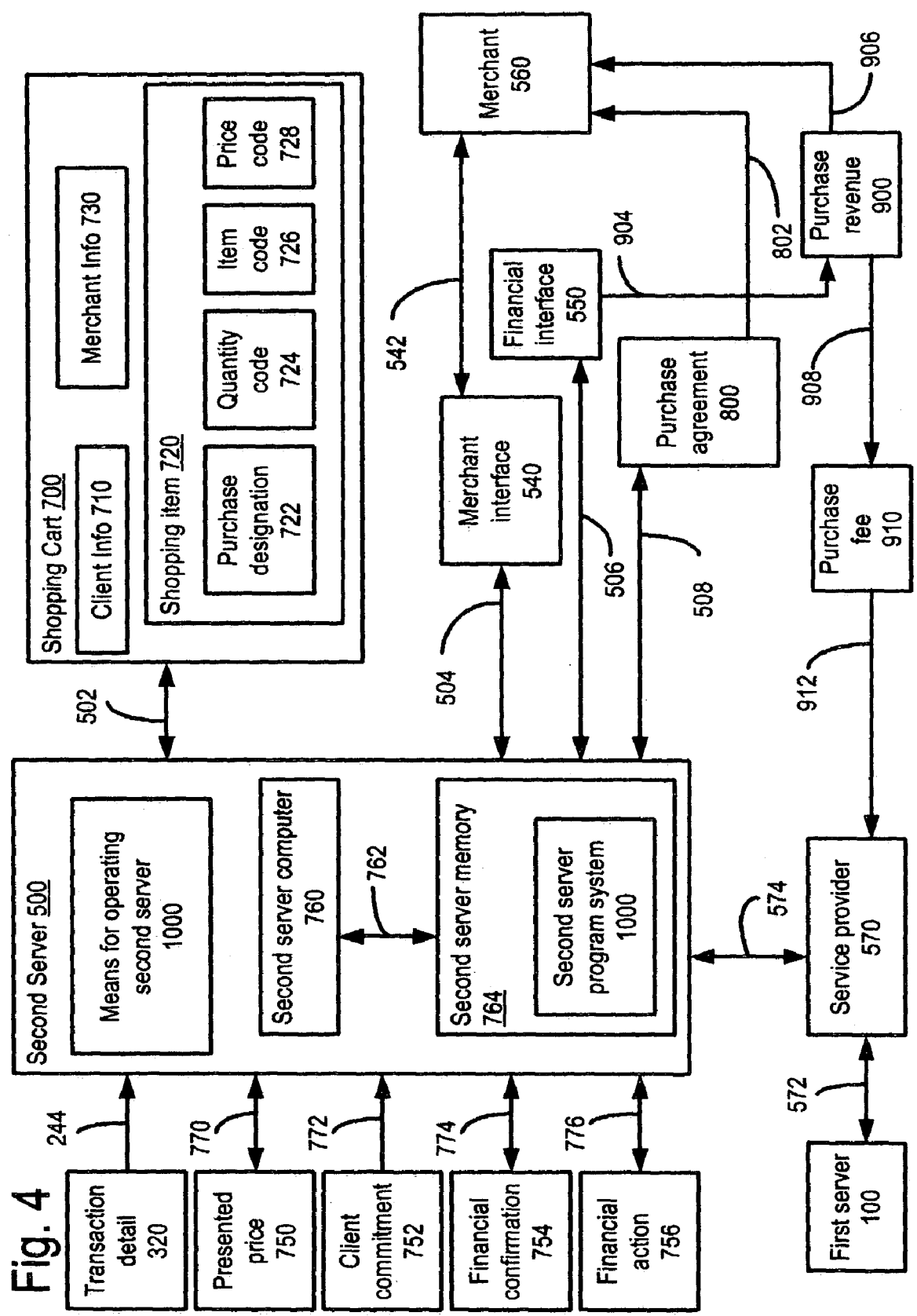

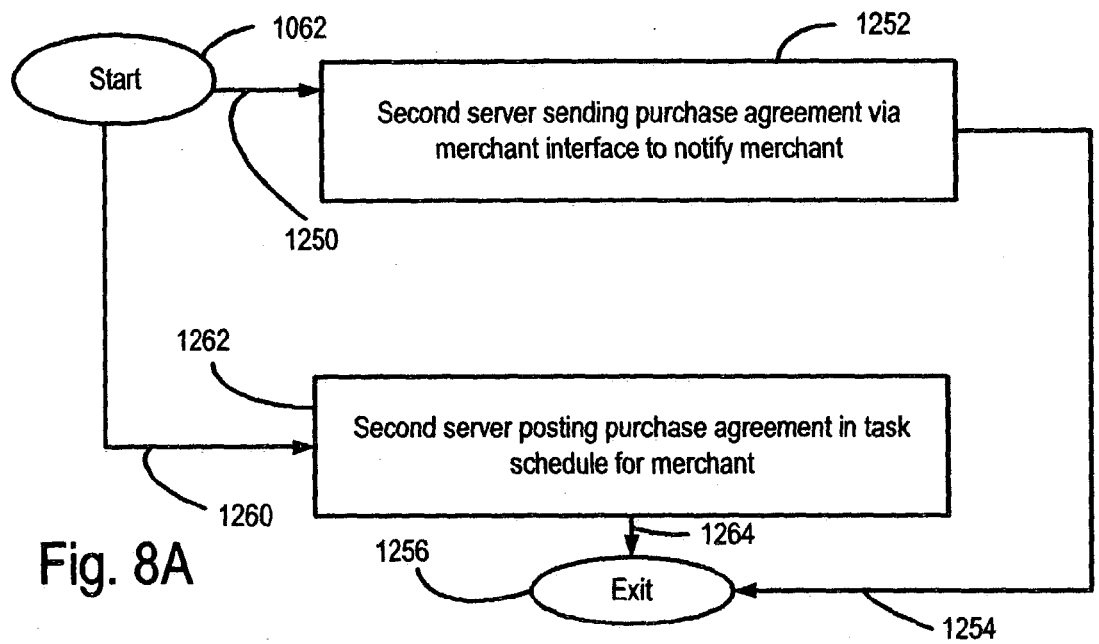
Fig. 8A
Fig. 8B  Fig. 8C
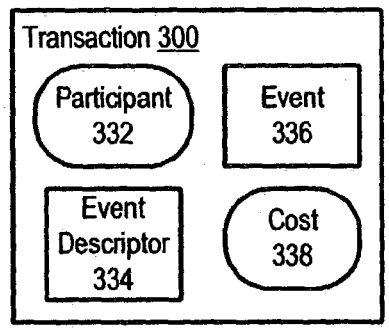
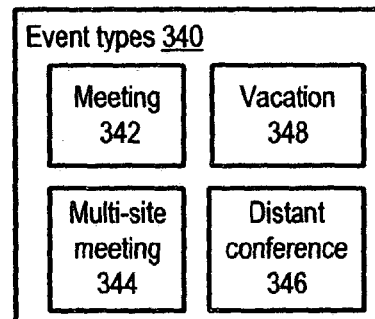
Fig. 8D
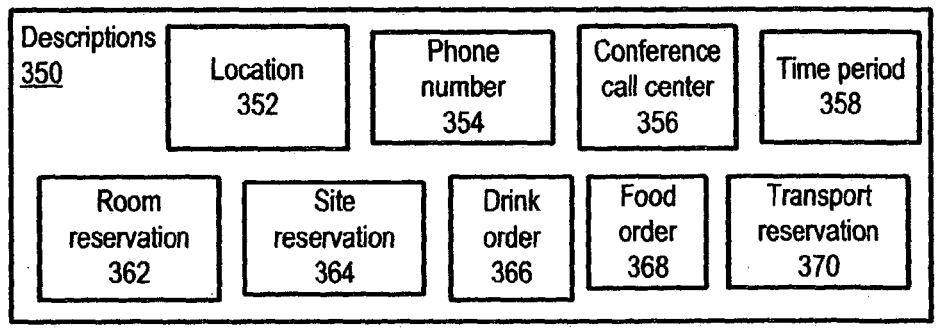
Fig. 8E
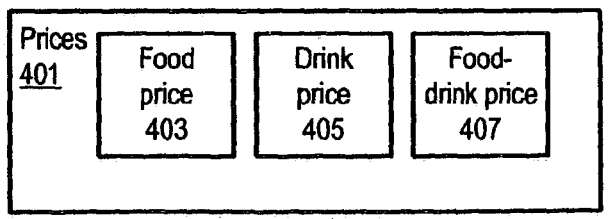

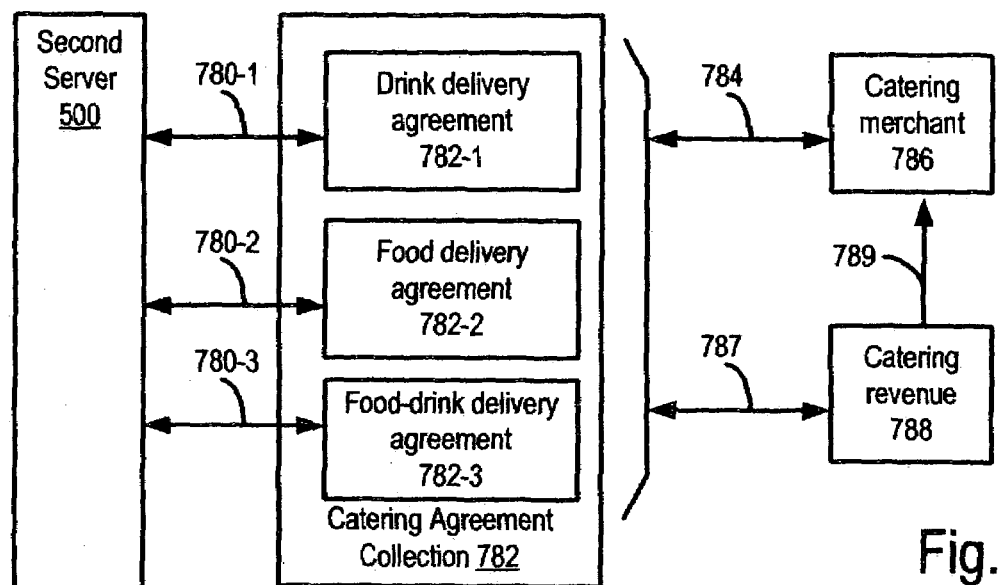
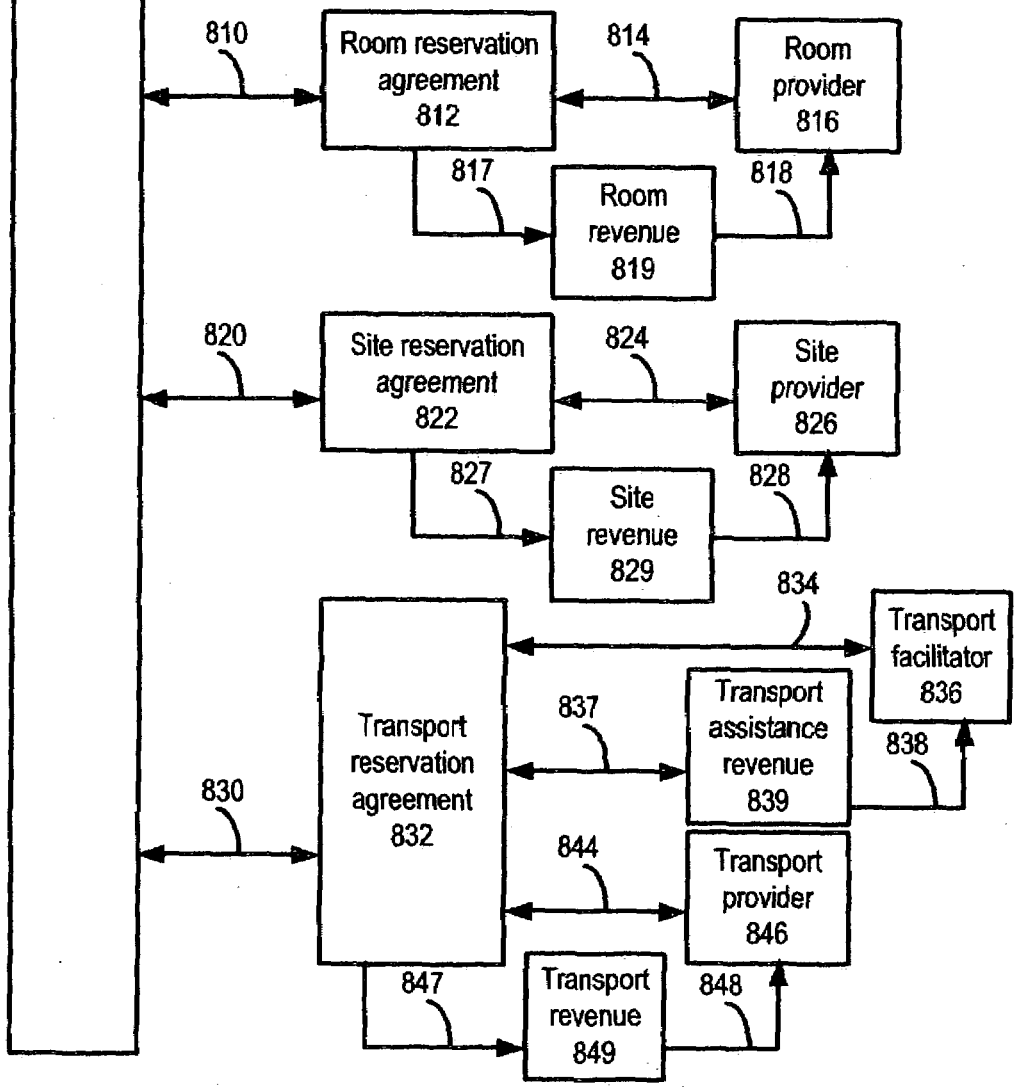
Fig. 9

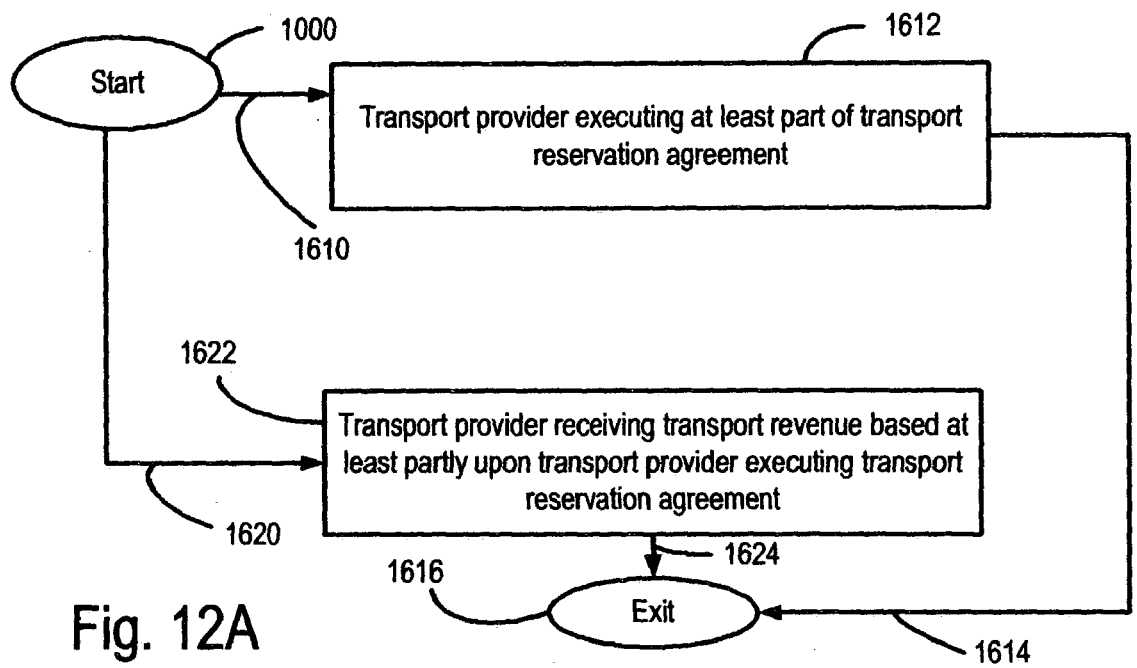
Fig. 12A
Fig. 12B
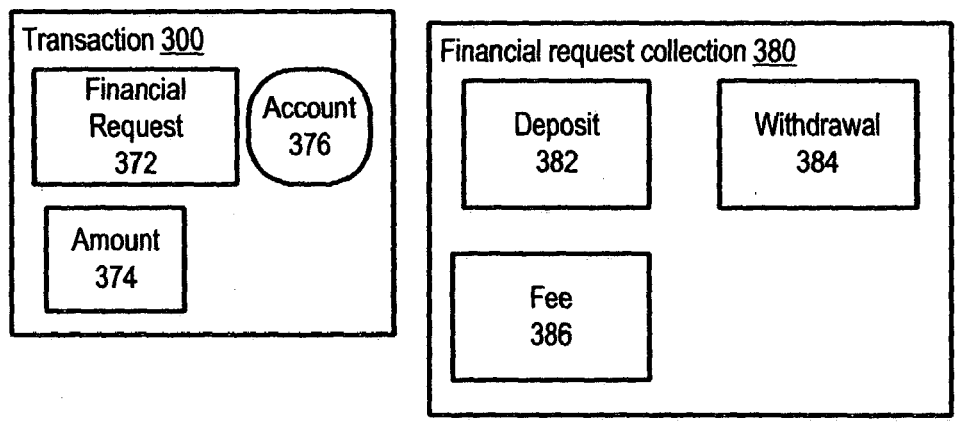
Fig. 12C
Fig. 12D
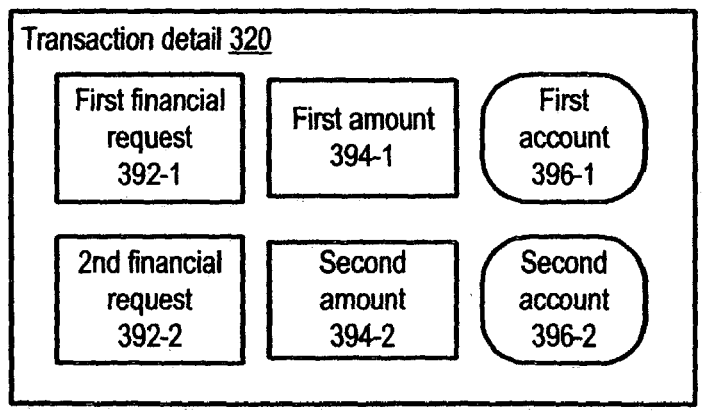

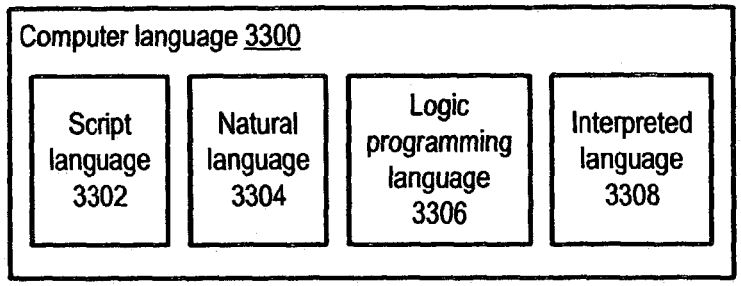
Fig. 23A
Fig. 23B
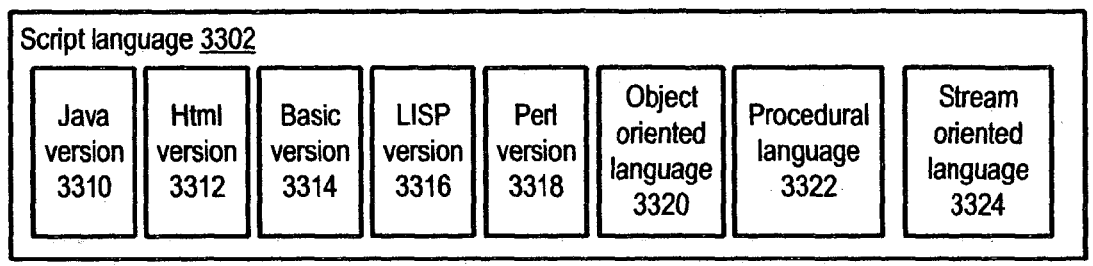
Fig. 23C
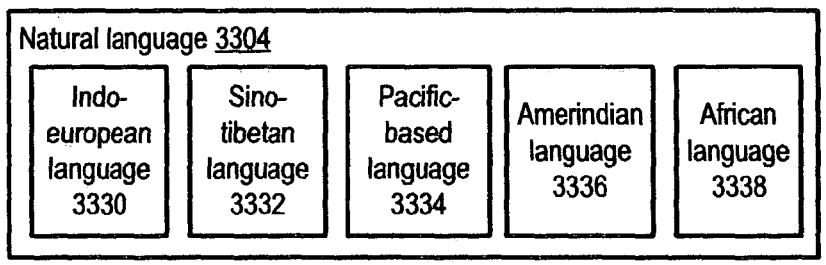
Fig. 23D
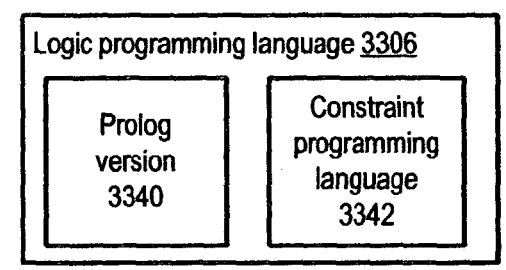
Fig. 23E
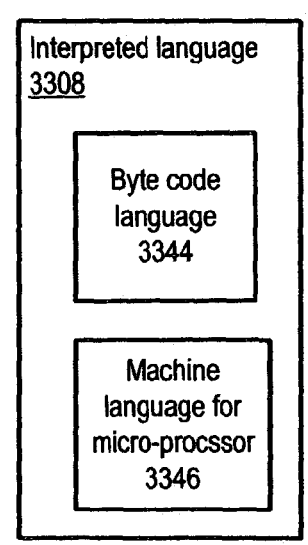
Fig. 23F
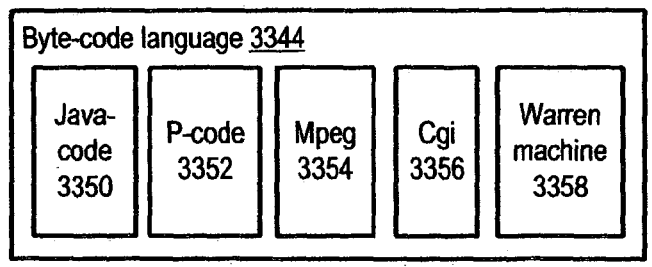

METHOD AND APPARATUS FOR CLIENT-IN-CHARGE BUSINESS TRANSACTION PROCESSING

BACKGROUND OF THE INVENTION

1. Field of the Invention

The invention relates to methods of business transactions involving client interfaces interacting with servers.

2. Background Information

The paradigm of today's business transaction systems is based upon two "computers", known as the client computer and the server for convenience. There are two common transaction processor architectures using these two "computers".

A server-heavy architecture forces the server to act every time a client cues the client computer with something that the server will eventually need. Pre-server programming, such as data validation, can be done on the client computer. However, the server is called with every client action that the server needs to know about.

The server-heavy architecture has a number of problems. There is a waste of bandwidth at the server, because every client interaction that changes information at the client is sent to the server. Server-heavy architectures are typically slow. The client takes an action, then the server takes over. The server is in control, not the client, because the client must wait until the server is ready to proceed, even to select another option on the same web page. At its worst, the client sees nothing happening, for a long time, before the client is allowed to proceed to another transaction.

A client-heavy architecture stores everything until the client computer must talk to the server. This storage requires permission from the client to store information on the client computer. Typically this architecture is much faster, but it has problems with client acceptance. Many organizations and users will not allow their client computers store information this way, due to possibly creating a security hole.

Many merchants do not want client-heavy architectures, because they lose the interim information on the server, which can provide insights into the buying patterns of their customers.

BRIEF SUMMARY OF THE INVENTION

A client-in-charge architecture is based upon a different approach to the problems of server bandwidth and latency found in the server-heavy architectures and does not need client acceptance as required by the client-heavy architectures.

Whenever the client enters information into an item presentation, a transaction detail is developed within the web view, without communication with the server. The client interface holds the transaction detail for every transaction until the client requests another web view. The server then receives the transaction detail summarizing the transactions from the web view interactions of the client and then provides the client the next requested web view.

Processing on the client interface can occur at any time (such as for data validation or modifications of elements within the client's current web view), however processing that is required on the server is held until the client indicates that they want another web view. Web view, as used herein, means any data presentation (visual, auditory, olfactory, tactile, taste, and virtual). The client can indicate that they are ready for another web view with any cue that is perceived by the server that means to change the data presented to the client. This includes but is not limited to, a pointing device, a hand motion, keyboard, speech, eye motion, or body events.

The invention solves the problems of frequent web page reloads and the need for multiple buttons that each process information and reload a page or load a different page for each financial or informational transaction. The navigation indicator within this invention summarizes the information presented and sends it to the server before performing the requested navigation.

The invention includes web views presenting one or more transactions as item presentations and at least one navigation activator from the client interface.

The invention includes a web browser, interactively displaying the item presentation to develop the transaction detail and navigation activators as discussed above.

Aspects of the invention support business transactions based upon, but not limited to, shopping carts, planning tools for meetings, travel and lodging, banking transactions, commodity trading, day planners, and scheduling functions.

BRIEF DESCRIPTION OF THE DRAWINGS

FIGS. 3A to 3C show aspects of the invention, where a transaction includes the purchase of a quantity of an item;

FIGS. 3D to 3F show a second transaction, a second item presentation, both used to develop the transaction detail;

FIG. 4 shows a more detailed view of FIG. 3B including the transaction detail, the presented price, the client commitment, the financial confirmation, the financial action, the service provider, and the purchase fee, all directed by operating the second server;

FIG. 8A further shows the second server notifying the merchant of FIG. 4; FIG. 8B to 8E show aspects of the invention based upon the transaction including at least one event described by at least one event descriptor;

FIG. 9 shows aspects of the invention relating to business transactions involving catering, reservations for rooms and sites, and transportation based upon getting transaction details for transactions as in FIG. 8B;

FIGS. 11B and 12A show the inventive method of FIGS. 4-5 using the second server for business transactions regarding the transportation reservation agreement of FIGS. 9 and 11B;

FIGS. 12B to 12D show a transaction including a financial request and an amount, optionally an account, a financial request collection, and a transaction detail reflecting the transaction;

FIGS. 23A to 23F show members of the computer language collection used in implementing various aspects of the invention;

DESCRIPTION OF THE PREFERRED EMBODIMENTS

A client-in-charge architecture is based upon a different approach to the problems of server bandwidth and latency found in the server-heavy architectures and does not need client acceptance as required by the client-heavy architectures.

Whenever the client enters information into an item presentation, a transaction detail is developed within the web view, without communication with the server. The client interface holds the transaction detail for every transaction until the client requests another web view. The server then receives the transaction detail summarizing the transactions from the web view interactions of the client and then provides the client the next requested web view.

Figure 1:
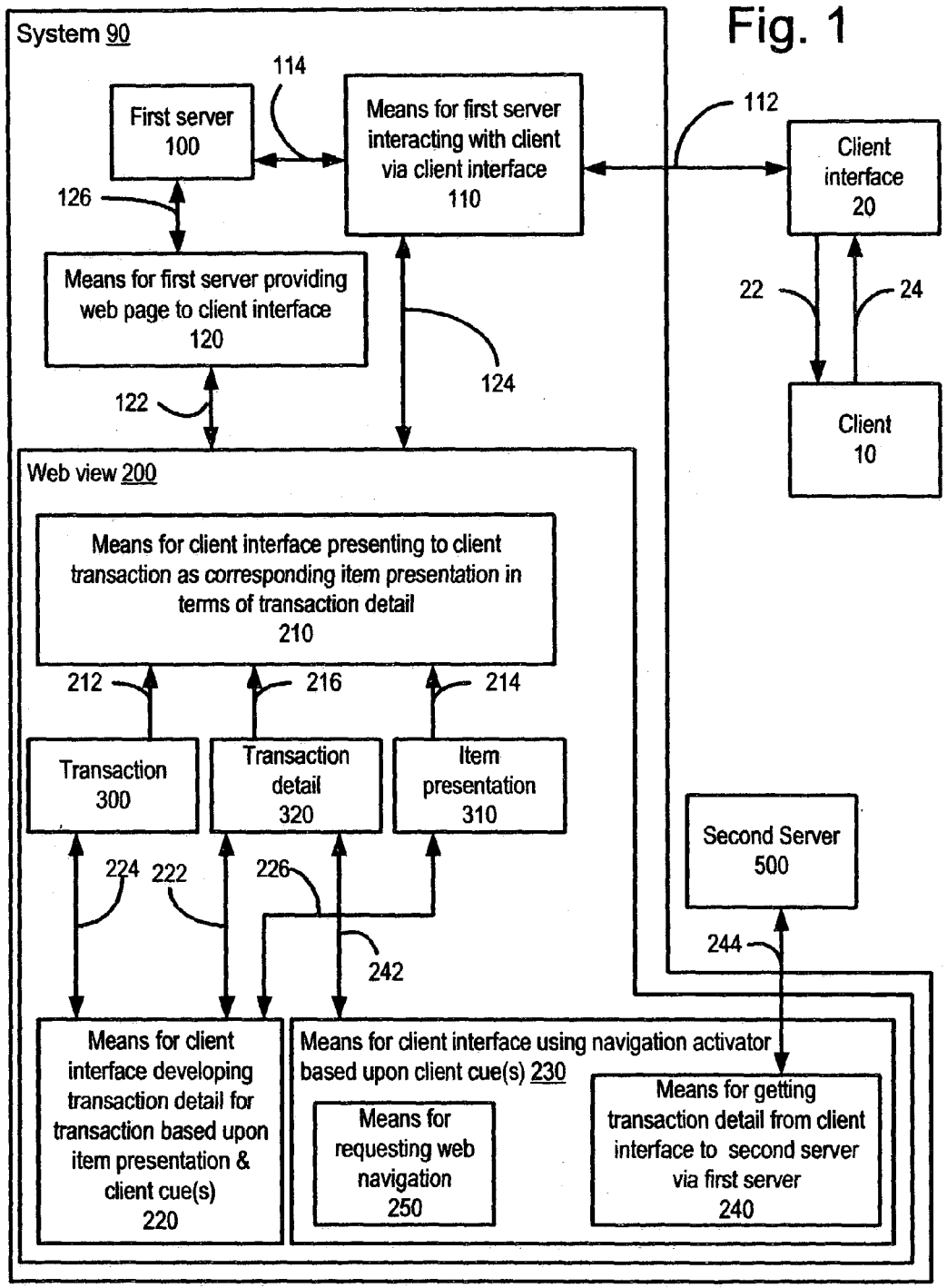
FIG. 1 shows the invention operating a first server interacting with a client via a client interface, and providing a web view to client interface.

The invention includes system 90 operating a first server 100 interacting with a client 10 via a client interface 20, and providing a web view 200 to client interface 20, as in FIG. 1.

In FIG. 1, system 90 includes at least the following. A first server 100 is coupled 114 to means 110 for the first server 100 to interact 112 via client interface 20 with a client 10. The first server 100 is also coupled 126 to means 120 for the first server 100 providing 122 web view 200 to client interface 20, which is sent 124 to means 110, which forwards it via 112 to the client interface 20.

In FIG. 1, web view 200 includes the following.

A means 210 for the client interface 20 to present 22, to the client 10, at least one transaction 300 based upon 214 the corresponding item presentation 310 and based upon 216 a transaction detail 320.

Arrow 212 supports means 210 referencing the transaction 300 as in FIG. 3A.

Arrow 212 may further reference multiple transactions 300 as in FIG. 3D.

A means 220 for the client interface 20 developing 222 the transaction detail 320 for 224 transaction 300 based upon 226 the corresponding item presentation 310 and based upon at least one cue 24 from the client 10.

A means 230 for the client interface 20 using at least one navigation activator based upon the client cues 24. Means 230 includes a means 240 for getting 242 the transaction detail 320 from the client interface 20 to 244 a second server 500 via the first server 100, and a means 250 for requesting web navigation.

Figure 2A:
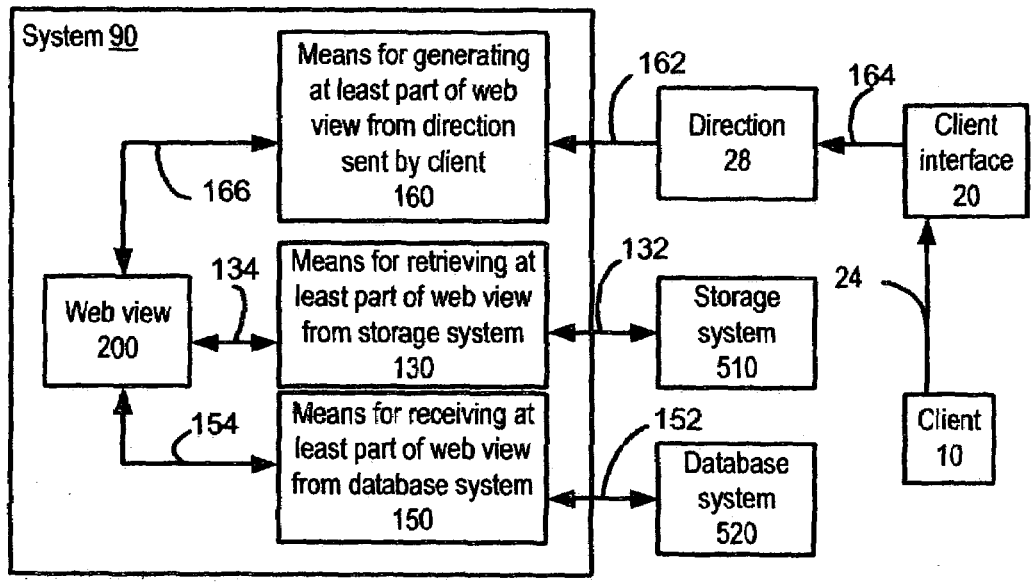
FIG. 2A shows the system of FIG. 1 further including means for retrieving, generating, s and receiving at least part of the web view.
Figure 2B:
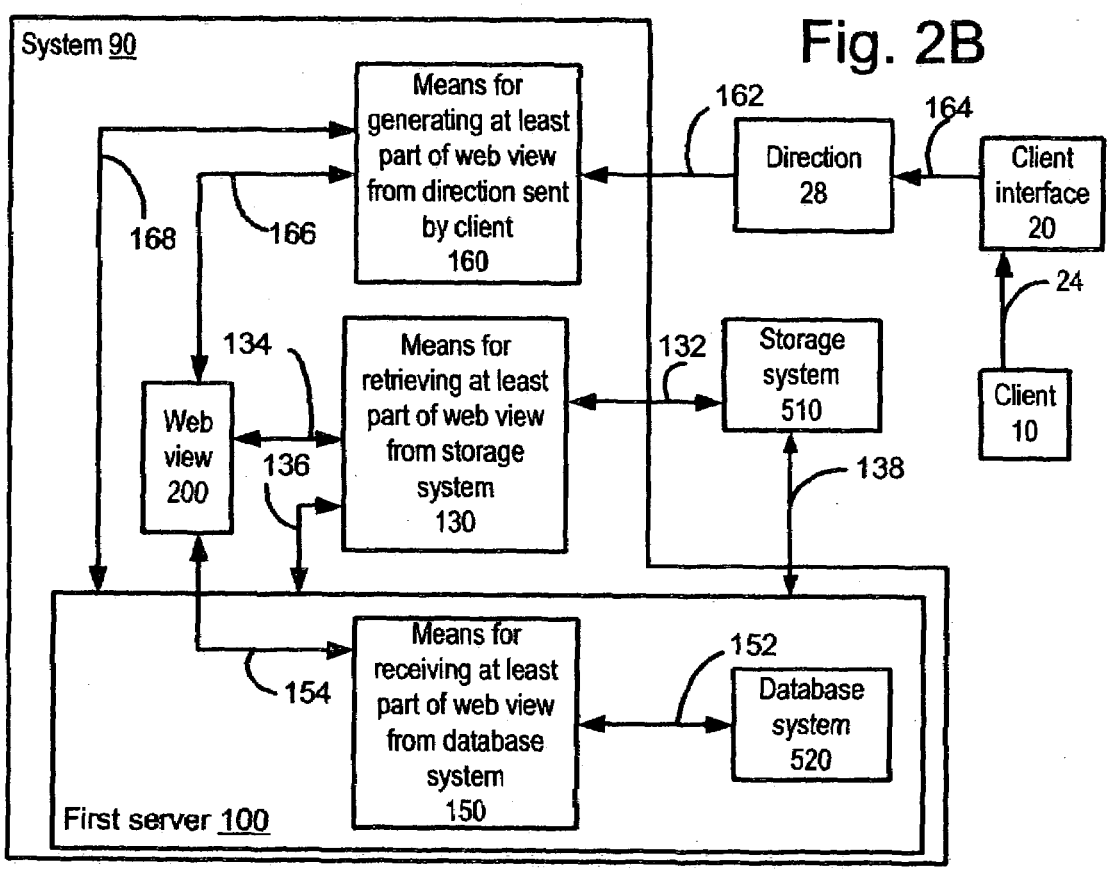
FIG. 2B shows an alternative system for FIG. 2A with the first server including the receiving means and the database system.

As in FIGS. 2A and 2B, the system may further include at least one of the following:

Means 130 for retrieving 132 at least part of the web view 200 from a storage system 510.

Means 160 for generating 166 at least part of the web view 200 from 164 a direction 28 sent 162 from the client interface 20 based upon cues 24 from the client 10.

Means 150 for receiving 154 at least part of the web view 200 from 152 database system 520.

In certain aspects of the invention, the system 90 preferably includes at least one the following: the storage system 510 and the database system 520. The first server 100 may further be preferred to include at least one of the following: the storage system 510 and the database system 520. FIG. 2B shows database system 520 included in both system 90 and first server 100.

In certain aspects of the invention, the first server 100 is preferably coupled to at least one of the following: storage system 510 and database system 520. FIG. 2B shows first server 100 coupled 138 to the storage system 510.

In certain aspects of the invention, the first server 100 is preferably coupled to at least one of the means for retrieving 130, generating 160, and receiving 150 parts of the web view 200. FIG. 2B shows first server 100 coupled 136 to means for retrieving 130 at least part of the web view 200. FIG. 2B also shows first server 100 coupled 168 to means for generating 160 at least part of web view 200.

In certain aspects of the invention, system 90 preferably includes second server 500. In certain further aspects of the invention, the first server 100 preferably and the second server 500 are the same. For example, small business systems often put the first and second server on a.single computer.

In other preferred aspects of the invention, the first server 100 is essentially distinct from the second server 500, as in FIG. 1. Such aspects include, but are not limited to, situations where the first server 100 provides a shopping portal, and/or virtual mall, and/or an auction house, and/or a trading zone for multiple merchants, with separate servers for their business activities.

In FIG. 3A, transaction 300 includes a purchase 302 of a quantity 304 of an item 306. In certain aspects of the invention the transaction 300 includes at least one price 308. Alternatively, transaction 300 may not include a price 308 as presented by the web view 200.

In FIG. 3B, item presentation 310 includes at least one quantity designation 314 and an item designation 316. The item presentation 310 may further include at least one purchase designation 312. The item presentation 310 may further include at least one price designation 318, or may not include the price designation 318.

In FIG. 3C, transaction detail 320 includes at least one quantity indication 324 and an item indication 326. The transaction detail 320 may further include at least one purchase indication 322. The transaction detail 320 may further include at least one price indication 328, or may not include the price indication 328.

The invention may further include a second transaction 300-2, and a second item presentation 310-2, both used to develop transaction detail 320, as in FIGS. 3D to 3F.

Aspects of the invention include the second server 500 maintaining a database altered by getting the transaction detail 320. Aspects of the invention include the second server 500 generating at least one report based upon getting the transaction detail 320. The various combinations of database and report activities will be disclosed in detail for business transactions and revenues resulting from these transactions. However, aspects of the invention apply to other application areas. These examples are provided to clarify the invention and are not meant to limit the scope of the claims.

FIG. 4 shows a more detailed view of FIG. 3B further including transaction detail 320, the presented price 750, client commitment 752, financial confirmation 754, financial action 756, service provider 570, purchase fee 910, all directed by the means 1000 for operating the second server 500.

The invention includes the second server 500 maintaining 502 a shopping cart 700 for client 10, as in FIG. 4. The second server 500 further provides a means, also 502, for developing a shopping item 720 included in the shopping cart 700, based upon the transaction detail 320 getting 244 to second server 500.

A computer as used herein will include, but is not limited to at least one instance of a member of the collection comprising an instruction processor, an inferential engine, a neural network, and a finite state machine. The instruction processor includes at least one instruction processing element and at least one data processing element, each data processing element controlled by at least one instruction processing element.

The following figures include flowcharts of at least one method of the invention possessing arrows with reference numbers. These arrows will signify of flow of control and sometimes data, supporting implementations including at least one program step or program thread executing upon a computer, inferential links in an inferential engine, state transitions in a finite state machine, and learned responses within a neural network.

The step of starting a flowchart refers to at least one of the following. Entering a subroutine in a macro instruction sequence in a computer. Entering into a deeper node of an inferential graph. Directing a state transition in a finite state machine, possibly while pushing a return state. And triggering at least one neuron in a neural network.

The step of termination in a flowchart refers to at least one of the following. The completion of those steps, which may result in a subroutine return, traversal of a higher node in an inferential graph, popping of a previously stored state in a finite state machine, return to dormancy of the firing neurons of the neural network.

A step in a flowchart refers to at least one of the following. The instruction processor responds to the step as a program step to control the data execution unit in at least partly implementing the step. The inferential engine responds to the step as nodes and transitions within an inferential graph based upon and modifying a inference database in at least partly implementing the step. The neural network responds to the step as stimulus in at least partly implementing the step. The finite state machine responds to the step as at least one member of a finite state collection comprising a state and a state transition, implementing at least part of the step.

Several flowcharts include multiple steps. In certain aspects, any one of the steps may be found in an embodiment of the invention. In other aspects, multiple steps are needed in an embodiment of the invention. When multiple steps are needed, these steps may be performed concurrently, sequentially and/or in a combination of concurrent and sequential operations. The shapes of the arrows in multiple step flowcharts may differ from one flowchart to another, and are not to be construed as having intrinsic meaning in interpreting the concurrency of the steps.

The memory referred to herein includes at least one instance of at least one member of a memory type collection comprising: a non-volatile memory, and a volatile memory. A non-volatile memory includes at least one memory state retained without applying a power source to the non-volatile memory. The volatile memory includes at least one memory state lost without applying the power source to the volatile memory.

The invention includes using second server 500 getting 244 transaction detail 320 for business transactions, as shown FIGS. 1, and 3A to 5, which include the following steps and/or means.

Maintaining 1012 a shopping cart 700, including shopping item 720, using 244 transaction detail 320 for client 10 accessing first server 100.

Establishing 1022 a price 308 for the purchase 302 of the quantity 304 of the item 306, to create a price code 728. Price code 728 is included in the shopping item 710, presented 770 to the client 10 via the first server 100 and client interface 20 to create a presented price 750.

Receiving 1032 a commitment to pay for the purchase 302 of the quantity 304 of the item 306 at the presented price 750 from the client 10 via client interface 20 and the first server 100 to create 772 a client commitment 752.

Confirming 1042 the client commitment 752 via 506 a financial interface 550, based upon the client information 710 included in the shopping cart 700, creating 774 a financial confirmation 754.

Creating 1052 a purchase agreement 800 for the quantity 304 of the item 306 at the presented price 750 based upon 774 the financial confirmation 754. When a single merchant is responsible for multiple shopping items, a single purchase agreement involving those multiple shopping items may be preferred.

Notifying 1062 merchant 560 of the purchase agreement 800.

Figure 6A:
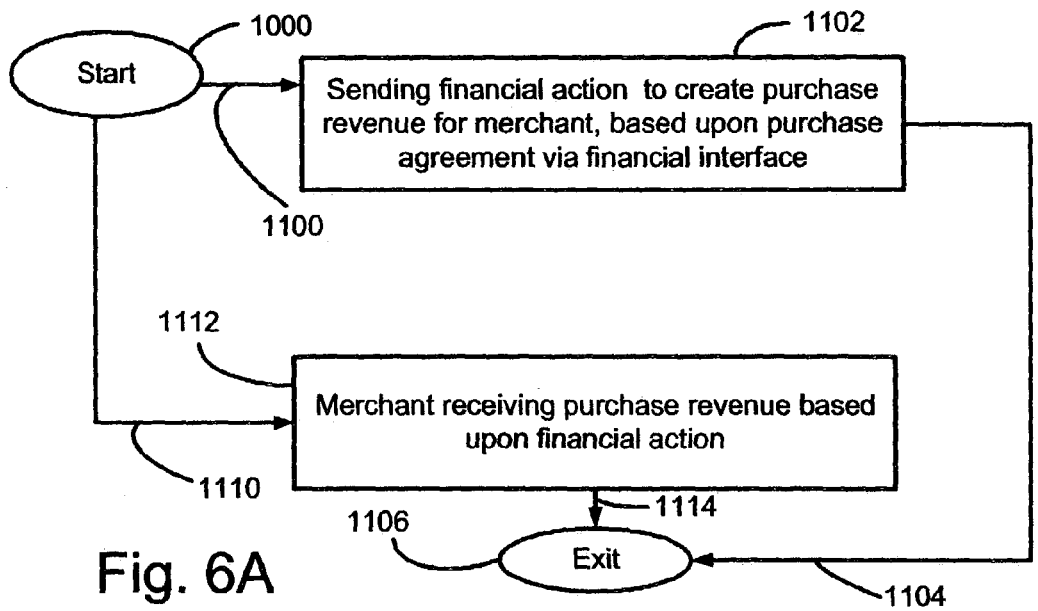
FIGS. 6A and 6B show the invention's method operating the second server of FIGS. 1 and 4.

Aspects of the invention include the following steps and/or means based upon FIG. 6A. Sending 1102 a financial action 756 based upon the purchase agreement 800 via 506 the financial interface 550 as shown in FIG. 4. The merchant 560 receives 1112 a purchase revenue 900 based upon the financial action 756.

Aspects of the invention include a service provider 570 administering at least one of the following: the first server 100 and/or the second server 500. FIG. 4 shows service provider 570 administering 572 the first server 100, and administering 574 the second server 500.

Figure 6B:
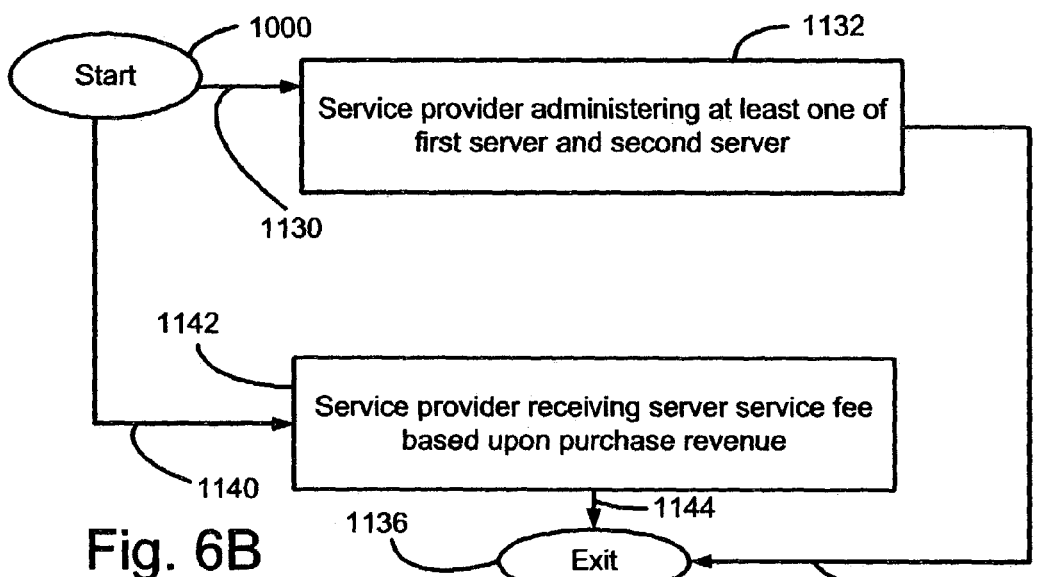

In FIG. 6B, service provider 570 administers 1132 at least one of the server collection member, including the first server 100 and the second server 500. The service provider 570 receives 1142 server service fee 910 based upon purchase revenue 900.

Figure 5:
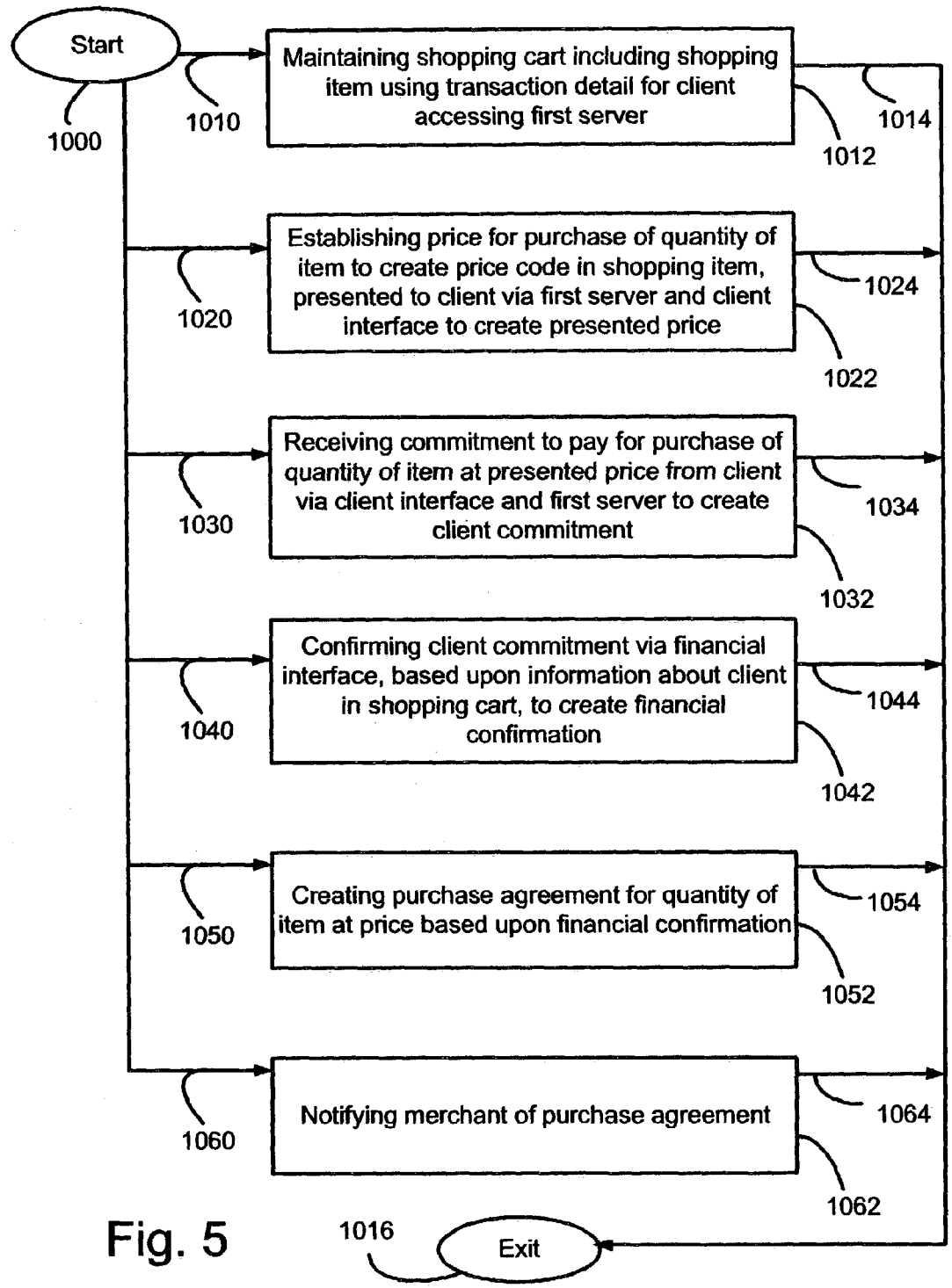
FIG. 5 shows the inventions method of operating the second server of FIGS. 1 and 4.
Figure 6C:
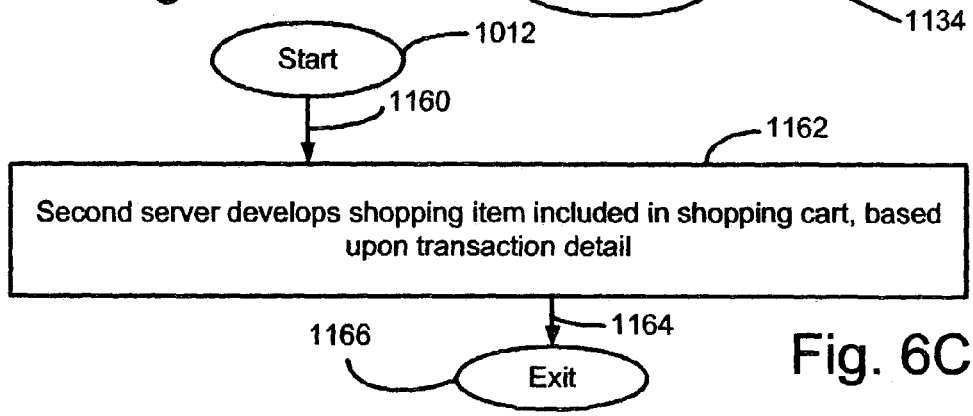
FIG. 6C further shows maintaining the shopping cart, including the shopping item, using the transaction detail of FIG. 5.

FIG. 6C shows a detail flowchart of step 1012 of FIG. 5 further maintaining the shopping cart 700, including the shopping item 720, using the transaction detail 320. The second server 500 develops 1162 the shopping item 720 included in the shopping cart 700, based upon the transaction detail 320.

Figure 7A:
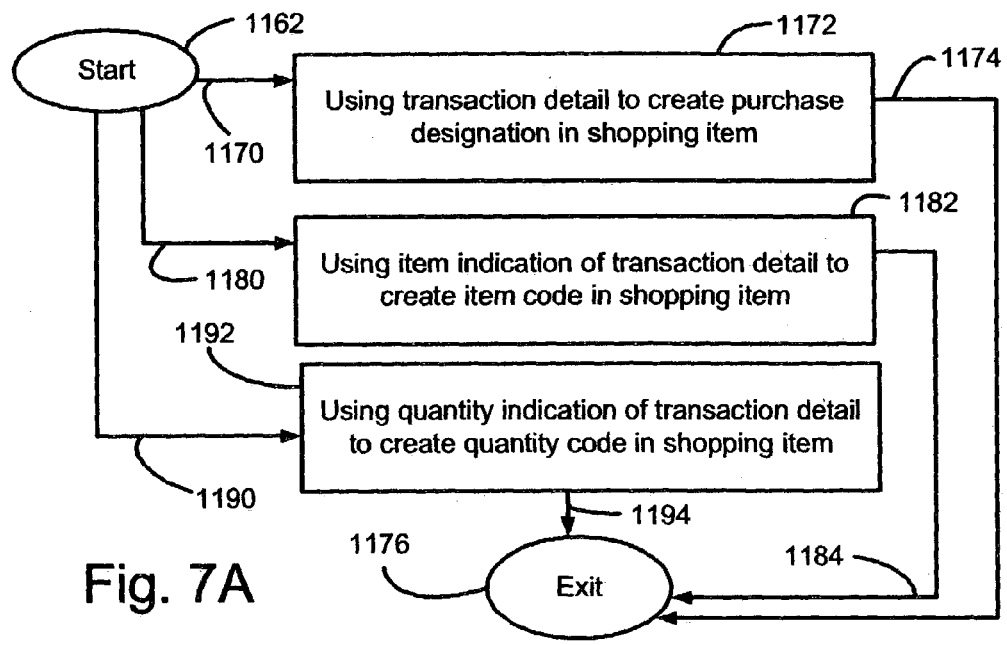
FIG. 7A further shows developing the shopping item of FIGS. 4 and 6C.

FIG. 7A shows a detail of step 1162 of FIG. 6C further developing the shopping item 720 of FIG. 4.

Step 1172 uses the transaction detail 320 of FIG. 3A to create a purchase designation 722 included in the shopping item 720 of FIG. 4.

Step 1182 uses the item indication 326 of the transaction detail 320 to create an item code 726 included in the shopping item 720.

Step 1192 uses quantity indication 324 of transaction detail 320 to create a quantity code 724 included in the shopping item 720.

Figure 7B:
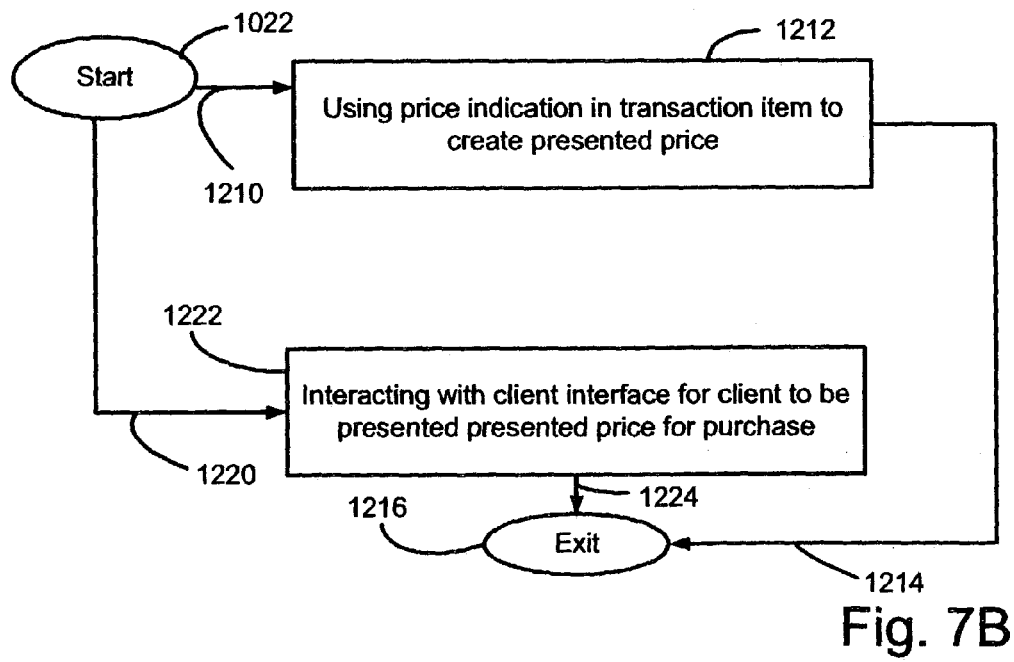
FIG. 7B further shows establishing the price as in FIG. 5.

FIG. 7B shows step 1022 of FIG. 5 further establishing the price.

Step 1212 uses a price indication 328 included in the transaction item 320 of FIG. 3A to create the presented price 750 of FIG. 4.

Step 1222 sends the client interface 20 presenting to the client 10 the presented price 750 for the purchase 302.

The presented price 750 may refer to one or more transactions 300, and may further include other fees, such as sales tax and shipping expenses.

Aspects of the invention include the following products shown in FIG. 4 of the various processes of the invention as in FIGS. 5 to 7B:

transaction detail 320 getting 244 to the second server 500, the presented price 750, the shopping item 720 developed from the transaction detail 320, the shopping cart 700 including the shopping item 720.

the client commitment 752, the financial confirmation 754, the financial action 756, the purchase agreement 800, the purchase revenue 900 received 906 by the merchant 560, and resulting from 904 the financial interface 550 receiving the financial action 756, as well as, the purchase fee 910 received 912 by service provider 570 based at least partly upon 908 the purchase revenue 900.

Aspects of the invention include means 1000 for implementing the method using the second server 500 for business transactions, as in FIG. 4. The means 1000 may include one, or any combination, of the following mechanisms to implement at least part of at least one step of, the method as in FIG. 5 or later.

A second server computer 760 controlled by a second server program system 1000 for the step comprised of at least one program step residing in a second server memory 764, which is accessibly coupled 762 to the second server computer 760, as in FIG. 4.

Aspects of the invention as in FIG. 8A, for the second server notifying the merchant, may include one of the following.

The second server 500 sending 1252 a version of the purchase agreement 800, of FIG. 4, via 504 a merchant interface 540 to 542 notify the merchant 560.

The second server 500 posting 1262 the purchase agreement 800 in a task schedule (not shown in FIG. 4) to 802 the merchant 560. A task schedule is often a database with associated report generators.

In certain aspects of the invention, there is a direct business relationship between the merchant 560 and the second server 500 of FIG. 4.

The merchant 560 may at least partly own the second server 500.

The merchant 560 may at least partly control the second server 500.

The merchant 560 may at least partly manage the second server 500.

Alternatively, the merchant 560 may subscribe to be notified by the second server 500.

The invention is based upon the transaction 300 including at least one participant 332 for an event 336 described by at least one event descriptor 334, as in FIG. 8B.

The event descriptor 334 preferably includes at least one member of the description collection 350 as in FIG. 8D including a location 352, a phone number 354, a conference call center 356, a time period 358, a room reservation 362, a site reservation 364, a drink order 366, a food order 368, and a transport reservation 370.

The event 336 preferably includes at least one member of the event type collection 340. The event type collection 340 as in FIG. 8C includes a meeting 342, a multi-site meeting 344, a distant conference 346, and a vacation 348.

Aspects of the invention include transaction details 320 containing at least one instance of a transaction 300, as in FIG. 8B.

A transaction 300 of FIG. 8B may further include at least one participant 332, in certain aspects of the invention.

A transaction 300 of FIG. 8B may include a cost 338, which in certain aspects of the invention may be a condition of the transaction, or generated as a query from presenting the transaction to various providers. The providers may bid to respond at or below the cost 338, in certain preferred embodiments. The cost 338 may be based upon members of the price collection 401 of FIG. 8E, including, but not limited to, one or more food prices 403, drink prices 405, and/or food-drink prices 407.

FIG. 9 shows aspects of the invention relating to second server 500 being used for business transactions involving catering, reservations for rooms and sites, and transportation, based upon getting 244 transaction details 320 as in FIG. 8B. These include at least one of the following.

Generating 780-1 a drink delivery agreement 782-1 with 784 a catering merchant 786 for the drink order 366 in the time period 358 at the location 352 of FIG. 8D costing a drink price 405 of FIG. 8E.

Generating 780-2 a food delivery agreement 782-2 with 784 the catering merchant 786 for the food order 368 in the time period 358 at the location 352 of FIG. 8D costing a food price 403 of FIG. 8E.

Generating 780-3 a food-drink delivery agreement 782-3 with 784 the catering merchant 786 for the drink order 366 and the food order 368 in the time period 358 at the location 352 of FIG. 8D costing a food-drink price 407 of FIG. 8E.

As one skilled in the art will recognize, there several other logistics planning services which can comparably benefit from the use of server 500 getting 244 a transaction detail 320 based upon transactions and their corresponding item presentations providing for such services. Such logistics planning services may include, but are not limited to, operational deployment plans such as in heavy construction, air traffic control, and coordinated activities of commercial and/or government units.

The delivery agreement collection 782 includes the drink delivery agreement 782-1, the food delivery agreement 782-2, and the food-drink delivery agreement 782-3, as in FIG. 9.

These aspects of the invention preferably further include the catering merchant 786 receiving 789 a catering revenue 788 based upon 787 at least one of the delivery agreement 782 members 782-1 to 782-3, as in FIG. 9.

The invention includes in FIG. 9, making 810 a room reservation agreement 812 for the room reservation 362 of FIG. 8D with 814 a room provider 816. Preferably, the room provider 816 receives 818 room revenue 819 based, at least in part, upon 817 the room reservation agreement 812.

The invention as in FIG. 9, making 820 a site reservation agreement 822 for the site reservation 364 of FIG. 5D with 824 a site provider 826. Preferably, the site provider 826 receives 828 a site revenue 829 based at least in part upon 827 the site reservation agreement 822.

The invention includes, as in FIG. 9, making 830 a transport reservation agreement 832 for the transport reservation 370 of FIG. 8D with 834 a transport facilitator 836. Preferably, the transport facilitator 836 receives 838 a transport assistance fee 839 based upon 837 the transport reservation agreement 832.

Another aspect of the invention includes in FIG. 9, a transport provider 846 executing 844 at least part of the transport reservation agreement 832 for the transport reservation 370 of FIG. 8D. Preferably, the transport provider 846 receives 848 a transport revenue 849 based at least in part upon 847 the transport reservation agreement 832. therefore: In an embodiment the transport provider is essentially the transport facilitator.

Figure 10A:
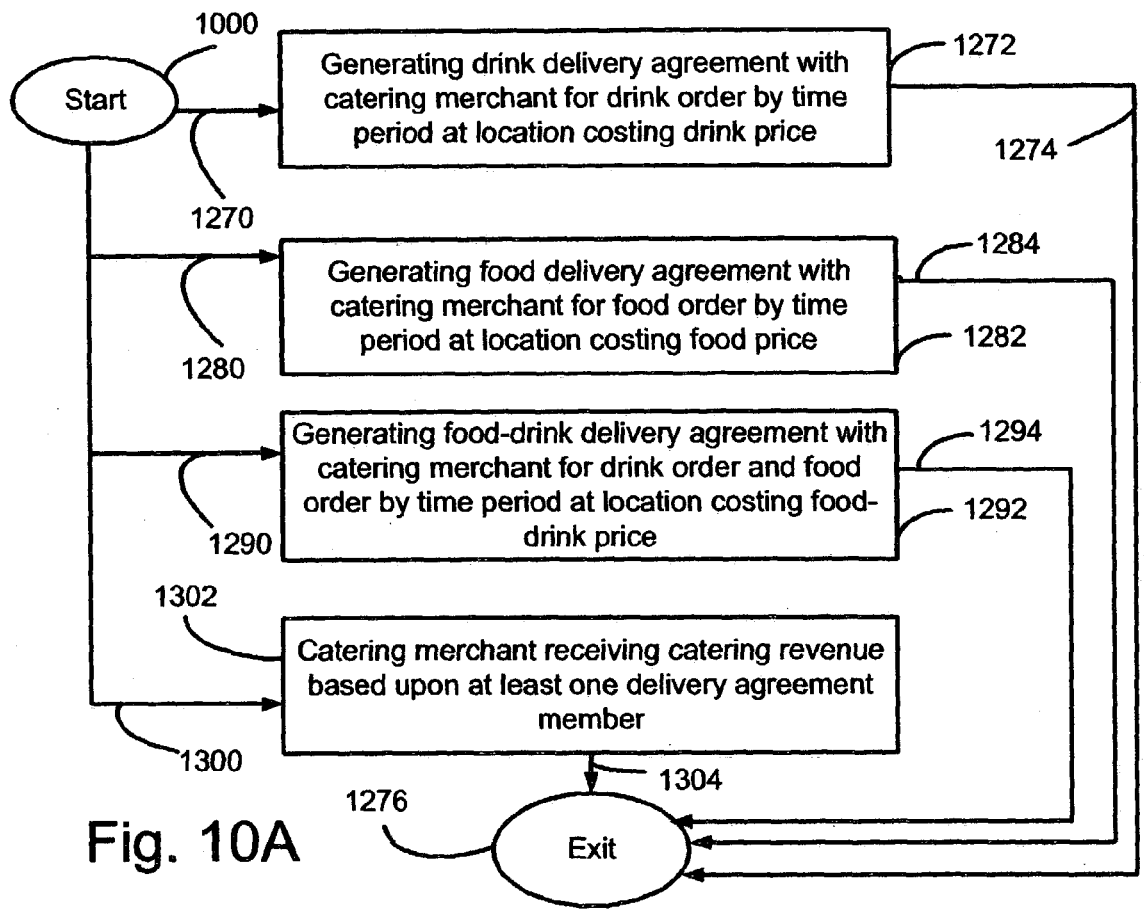
FIGS. 10A and 10B show the inventive method of FIGS. 4-5 using the second server for business transactions based upon getting transaction details as in FIG. 8B.

FIG. 10A shows a detail flowchart of the inventive method 1000 of FIGS. 4-5 further using second server 500 based upon getting 244 the transaction details 320 for transactions 300 as in FIG. 8B. The invention includes at least one of the following.

Step 1272 generates 780-1 the drink delivery agreement 782-1 with 784 a catering merchant 786 of FIG. 9, for the drink order 366 in the time period 358 at the location 352 of FIG. 5D costing a drink price 405 of FIG. 8E.

Step 1282 generates 780-2 a food delivery agreement 782-2 with 784 the catering merchant 786 of FIG. 9, for the food order 368 in the time period 358 at the location 352 of FIG. 8D costing a food price 403 of FIG. 8E.

Step 1292 generates 780-3 a food-drink delivery agreement 782-3 with 784 the catering merchant 786 for the drink order 366 and the food order 368 in the time period 358 at the location 352 of FIG. 8D costing a food-drink price 407 of FIG. 8E.

The invention may further, preferably, include step 1302 of FIG. 10A, with the catering merchant 786 receiving 789 a catering revenue 788 based upon 787 at least one of the delivery agreement 782 members 782-1 to 782-3, as in FIG. 9.

The invention includes the catering revenue 788 and each of the delivery agreement 782 members 782-1 to 782-3, as in FIG. 9, as products of the process further shown in FIG. 10A.

Figure 10B:
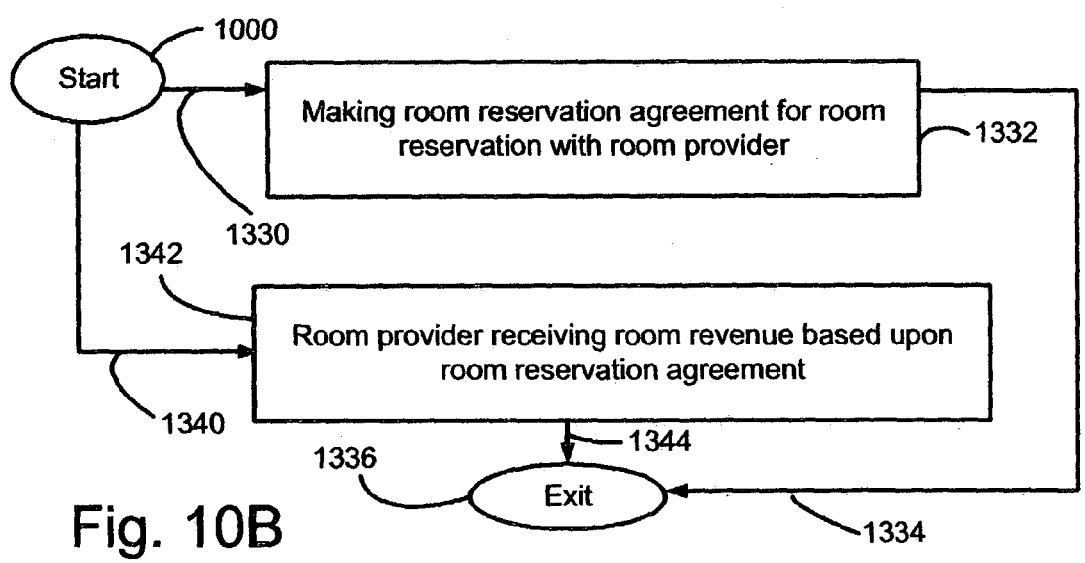

FIG. 10B shows another detail of the inventive method 1000 of FIG. 4-5 for transactions 300 of FIG. 8B, including the following.

Step 1332 makes 810 a room reservation agreement 812 for the room reservation 362 of FIG. 8D with 814 a room provider 816 as in FIG. 9.

Step 1342 supports the room provider 816 receiving 818 a room revenue 819 based at least in part upon 817 the room reservation agreement 812 as in FIG. 9.

Figure 11A:
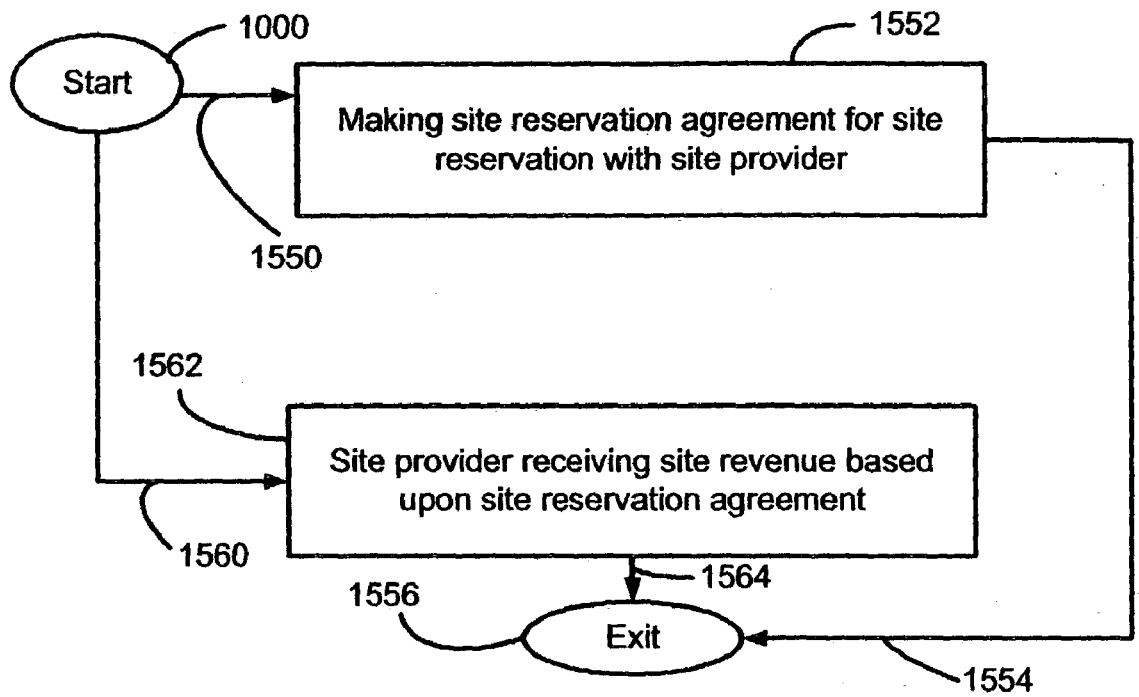
FIG. 11A shows the method of FIGS. 4-5 for site reservation agreements of FIG. 9.

FIG. 11A shows a detail of the transaction processing method 1000 of FIGS. 4-5 regarding the site reservation agreement 822 of FIG. 9. It includes the following.

Step 1552 makes 820 a site reservation agreement 822 for the site reservation 364 of FIG. 8D with 824 a site provider 826 as in FIG. 9.

Step 1562 supports the site provider 826 receiving 828 site revenue 829 based at least in part upon 827 the site reservation agreement 822.

Figure 11B:
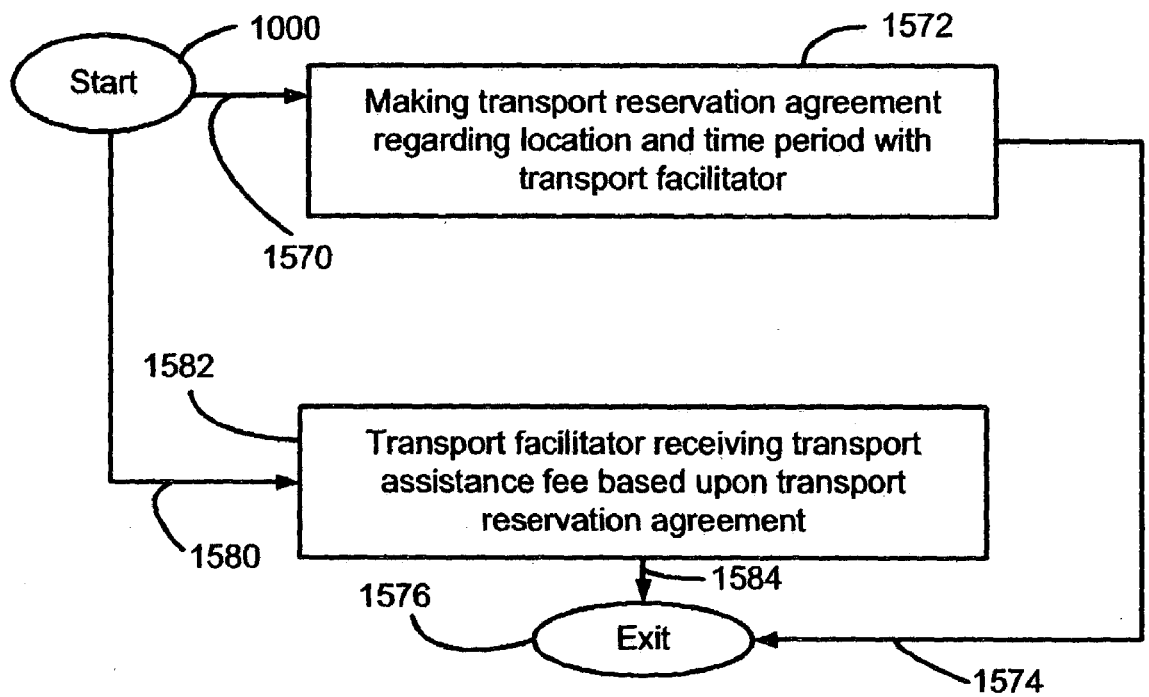

The invention in FIG. 11B, uses the second server 500 for business transactions regarding the transportation reservation agreement 832 of FIG. 9. It includes at least the first of the following.

Step 1572 makes 830 a transport reservation agreement 832 in FIG. 9, regarding the location 352 and the time period 358 of FIG. 8D, with 834 a transport facilitator 836.

In many cases, preferably, step 1582 supports the transport facilitator 836 receiving 838 a transport assistance fee 839 based upon 837 the transport reservation agreement 832.

The invention as in FIG. 12A, uses second server 500 for business transactions regarding the transportation reservation agreement 832 of FIGS. 9 and 11B. It includes the following.

Step 1612 supports the transport provider 846, shown in FIG. 9, executing 844 at least part of transport reservation agreement 832 for the transport reservation 370 of FIG. 8D.

Step 1622 supports the transport provider 846, shown in FIG. 9, receiving 848 the transport revenue 849 based at least in part upon 847 transport reservation agreement 832.

The transport assistance fee 839, the transport revenue 849, and the transport reservation agreement 832, of FIG. 9, are products of various aspects of the invention.

Aspects of the invention may include the second server 500 of FIGS. 1, 4, and/or 9, maintaining a task list including tasks (not shown) from transaction detail 320 getting 244 to the second server.

A transaction 300 may include a financial request 372 and an amount 374, optionally an account 376, a financial request collection 380 and a transaction detail 320, reflecting the transaction 300, as in FIG. 12B.

Figure 13A:
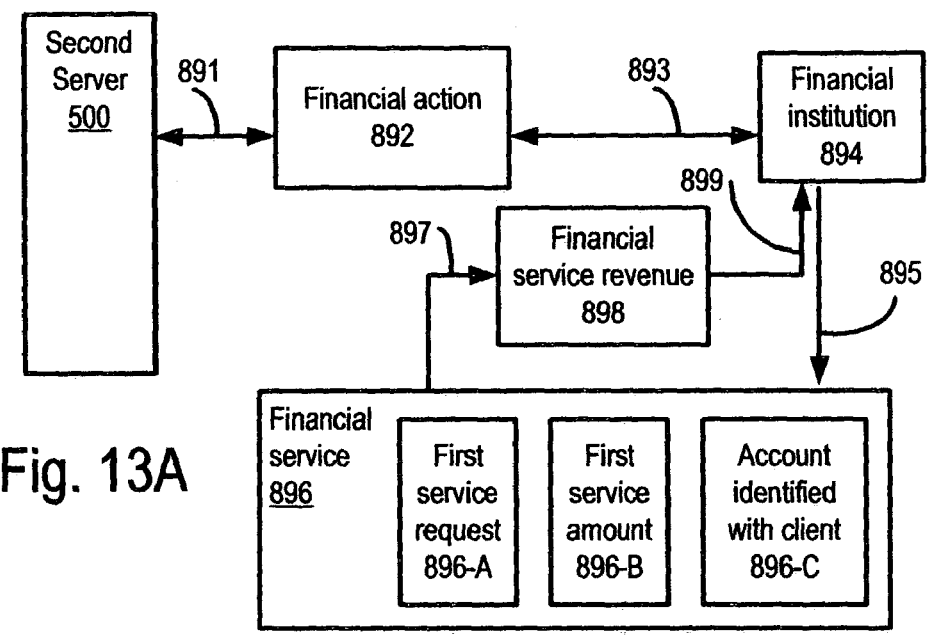
FIG. 13A shows the invention including the second server interacting with a financial institution based upon the transaction detail of FIG. 12B getting to the second server as in FIGS. 1 and 4.

Aspects of the invention include financial transaction processes using the second server 500 as shown in FIG. 13A, getting the transaction detail 320 as in FIG. 12D reflecting a transaction 300 as in FIG. 12B. The transaction 300 includes at least a financial request 372 for an amount 374. The transaction 300 may further include an account 376. The financial request 372 is one member of the financial request collection 380 as in FIG. 12C including a deposit 382, a withdrawal 384, and a fee 386. The transaction detail 320 reflects the transaction 300, including a first financial request 392-1 for a first amount 394-1. The transaction detail 320 may further reflect transaction 300 by including a second financial request 392-2 for a second amount 394-2.

The transaction detail 320 may further reflect the transaction by including a first account 396-1, as in FIG. 12B. Additionally, transaction detail 320 may further include a second account 396-2, when the transaction detail also includes the second financial request 392-2 for the second amount 394-2.

The invention including the second server 500 interacting with a financial institution 894 as in FIG. 13A, based upon the transaction detail 320 of FIG. 12D getting to the second server 500 as in FIGS. 1 and 4.

In FIG. 13A, the invention includes the second server 500 sending 891 a financial action 892 to 893 a financial institution 894 as in FIG. 13A, based upon the transaction detail 320 of FIG. 12D getting to the second server 500, as in FIGS. 1 and 4. The financial institution 894 provides 895 a financial service 896 based upon the financial action 892. The financial service 896 reflects the transaction detail 320, including a first service request 896-A reflecting the first financial request 392-1 of FIG. 12D for the first service amount 896-B reflecting the first amount 394-1 for an account 896-C identified with the client 10.

In certain aspects of the invention, the account 896-C of FIG. 13A reflects a first account 396-1 included in transaction detail 320 shown in FIG. 12D.

In FIG. 13A, the invention farther includes the financial institution 894 receiving 899 financial service revenue 898 based at least partly upon 897 the financial service 896.

Figure 13B:
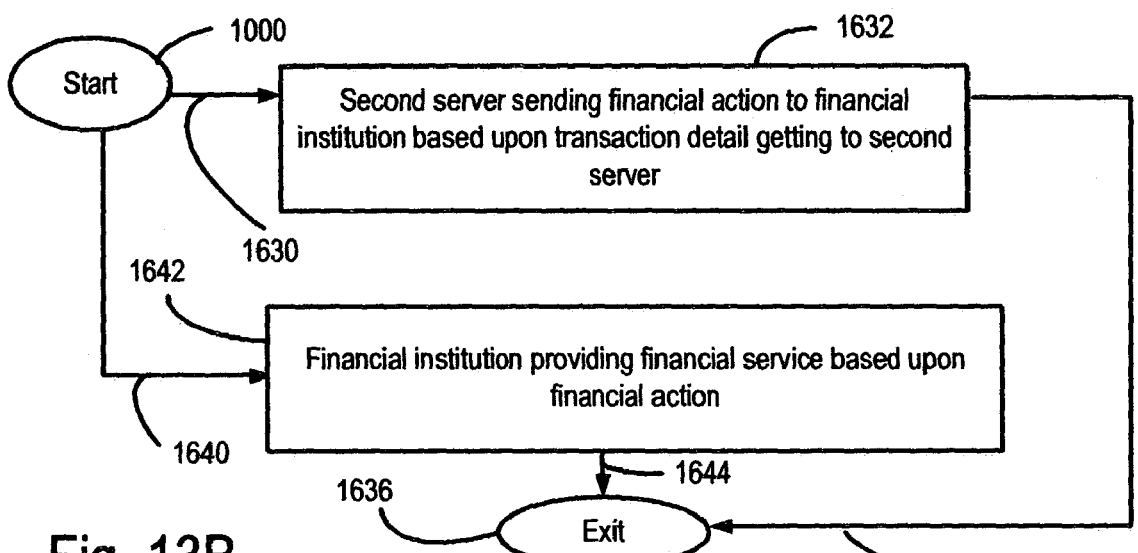
FIG. 13B shows the inventive method of FIGS. 4-5 using the second server for business transactions shown in FIG. 13A.

The invention as in FIG. 13B uses second server 500 for business transactions as in FIG. 13A, including the following.

Step 1632 supports the second server 500 sending 891 a financial action 892 to a financial institution 893 based upon the transaction detail 320 getting 244 to the second server, as in FIGS. 1 and 4.

Step 1642 supports the financial institution 894 providing 895 a financial service 896 based upon the financial action 892.

Step 1632 of FIG. 13B further supports the second server 500 sending the financial action 892 via 506 the financial interface 550, as in FIG. 4, to the financial institution 894.

Figure 13C:
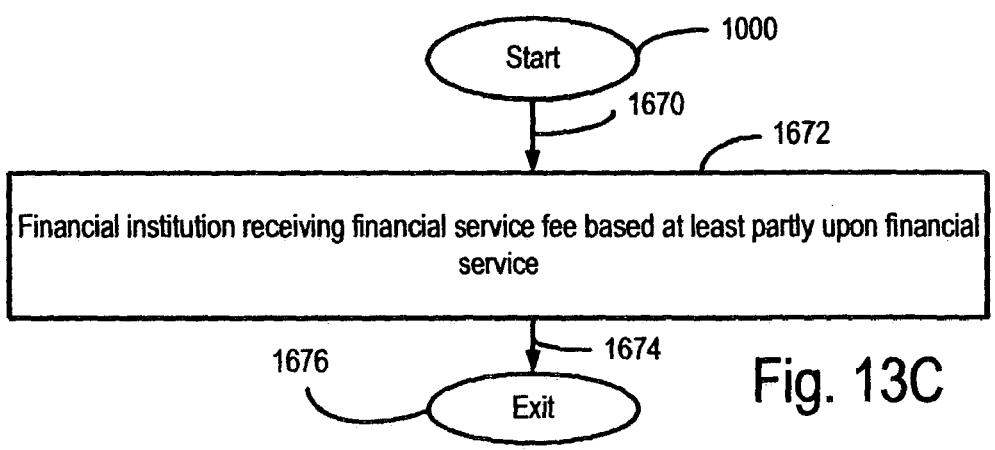
FIG. 13C shows the inventive method of FIGS. 4-5 and 13B, using the second server for business transactions as in FIG. 13A.

The invention as in FIG. 13C includes the following. Step 1672 supports the financial institution 894 receiving 899 financial service revenue 898 based at least partly upon 897 the financial service 896, as in FIG. 13A.

Figure 14A:
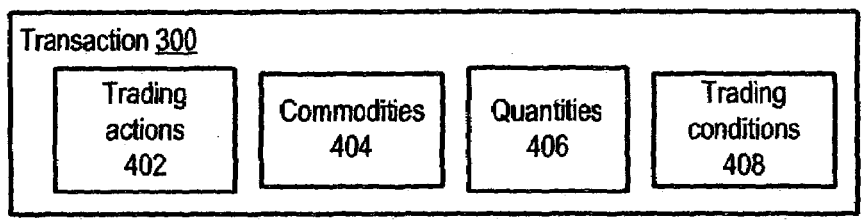
FIGS. 14A to 14E shows transactions and transaction details supporting commodity trading.

Aspects of the invention include transactions 300 as in FIG. 14A supporting commodity trading. Transactions 300 include trading actions 402, commodities 404, quantities 406, and trading conditions 408. A transaction detail 320, as in FIG. 14B, includes at least one instance of a transaction, each including a trading action 402, commodity 404, quantity 406, and a trading condition 408.

As used herein, a commodity refers to a fallible entity, one which is traded based upon its quantity rather than its unique identity. Wheat is an example of a fungible entity, a commodity, in that it is sold in bulk terms. Breeding stock is typically not a commodity. A breeding animal or plant is sold in terms of the entity's unique identity, its performance for example in racing, lineage, health, and so on. Other examples of commodities where the invention is useful include, but are not limited to, food commodities, energy commodities, stocks, bonds, options, and futures commodities.

Figure 14B:
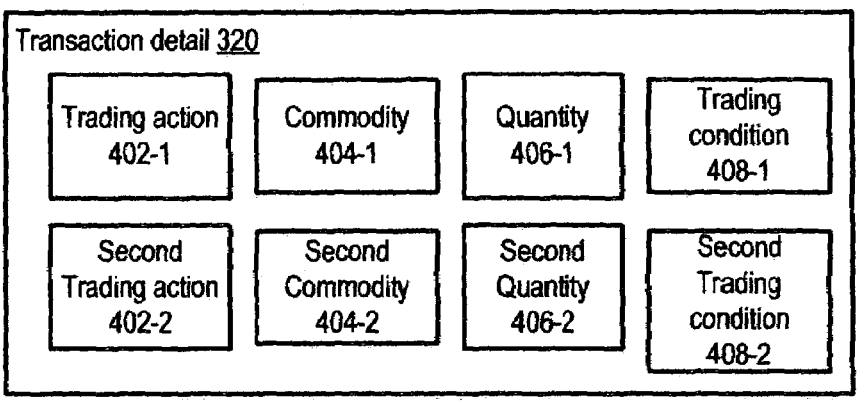

Preferred aspects of commodity trading transaction details 320 are shown in FIG. 14B with more than one transaction instance. The first transaction instance indicates a first trading action 402-1, a first commodity 404-1, a first quantity 406-1, and a first trading condition 408-1. The second transaction instance indicates a second trading action 402-2, a second commodity 404-2, a second quantity 406-2, and a second trading condition 408-2.

Figure 14C:
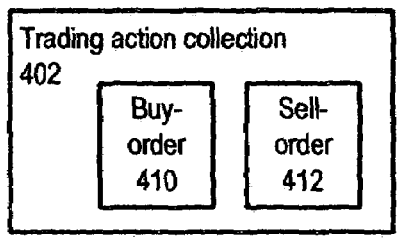

Trading actions 402 belong to the trading action collection as in FIG. 14C, including buy-orders 410 and sell-orders 412. Any combination of trading action members may be present in a transaction detail 320.

Figure 14D:
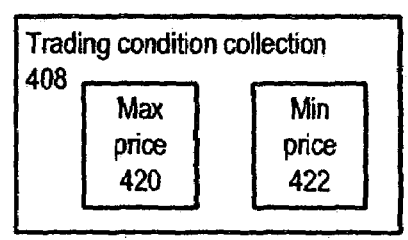

Trading conditions 408 are members of a trading condition collection as in FIG. 14D, which includes the following.
The trading condition 408 is a maximum price 420, when the trading action 402 is a buy-order 410.
The trading condition 408 is a minimum price 422, when the trading action 402 is a sell-order 412.

The invention includes trading commodities by using the invention's system and steps of FIGS. 1, 4 and 14A to 14D. The second server 500 may implement exactly the steps for commodity trading to be described hereafter, or a combination of shopping cart and commodity trading.

Figure 14E:
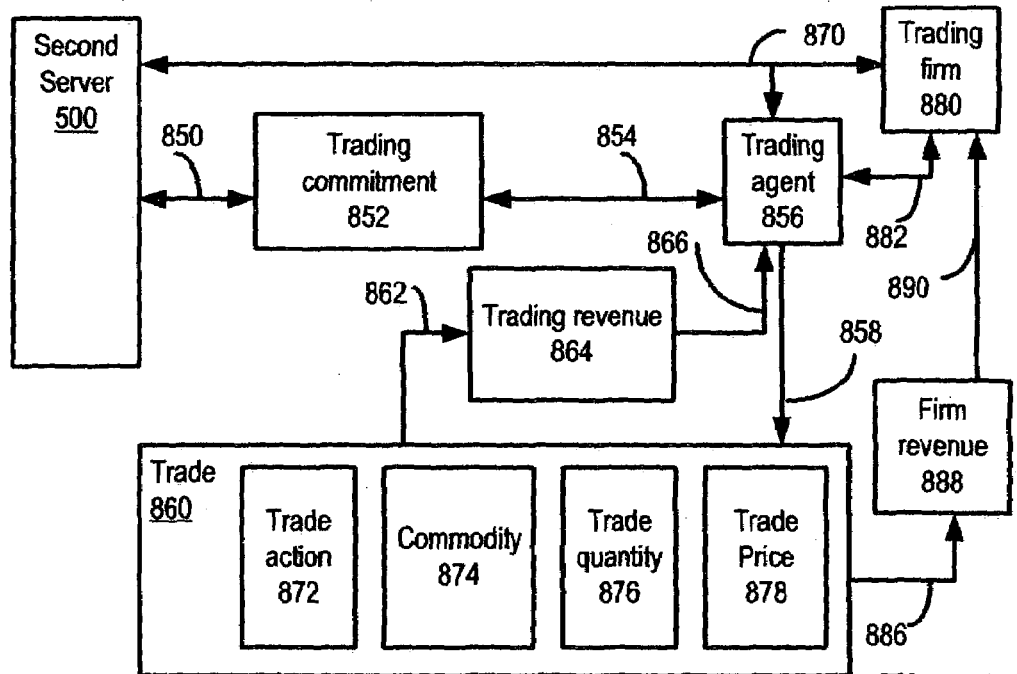

The method of trading commodities shown in FIG. 14E includes the following steps.
The second server 500 sends 850 a trading commitment 852, based upon getting 244 the transaction detail 320, to 854 a trading agent 856.
The trading agent 856 generates 858 a trade 860 based upon trading commitment 852.

One skilled in the art will recognize that a commodity trade 860 includes at least the trade action 872, either buying or selling, of the trade quantity 876 of the commodity 874 at a trade price 878. More sophisticated trades may include a succession of exchanges over time, as in options and futures trading. The trade 860 shown in FIG. 14 is the simplest of such trades, and is provided merely as an example. It is not meant to limit the scope of the claims.

Aspects of the invention further include the trading commitment 852, the commodity trade 860 and trading revenue 864 of FIG. 14 as products of the process of commodity trading using the second server 500 as shown and discussed in FIGS. 1, 4 and 14E.

Figure 15:
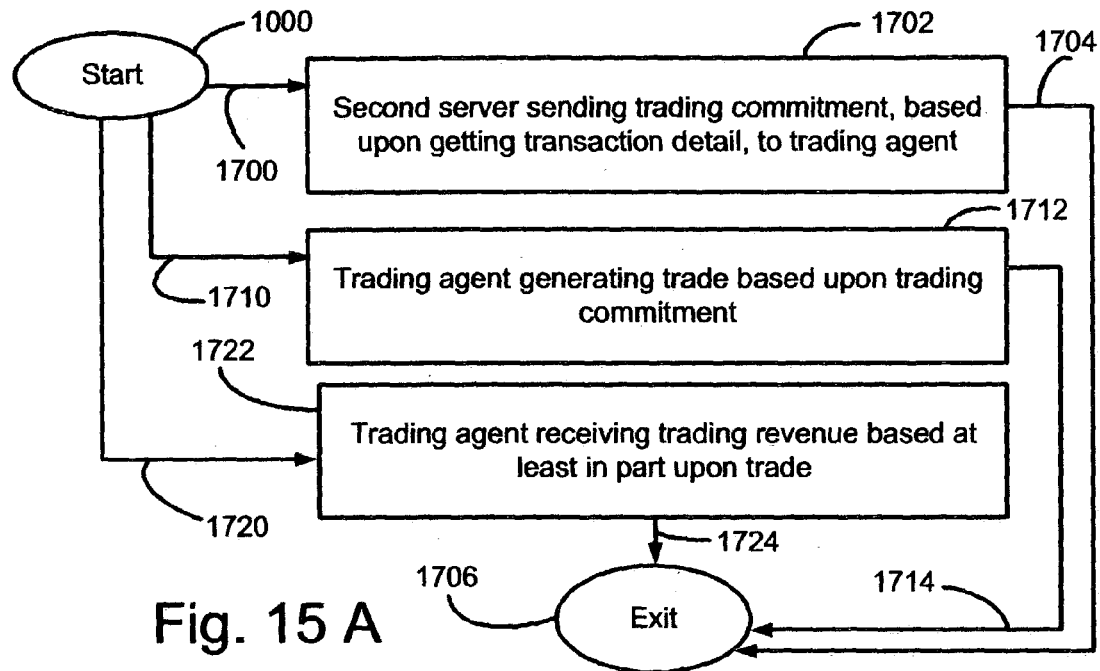
FIG. 15A shows the invention's method of commodity trading using the second server of FIGS. 1, 4, and 14.
FIG. 15B shows a trading agent interacting with the second server of FIGS. 14 and 15A.
Figure 15:
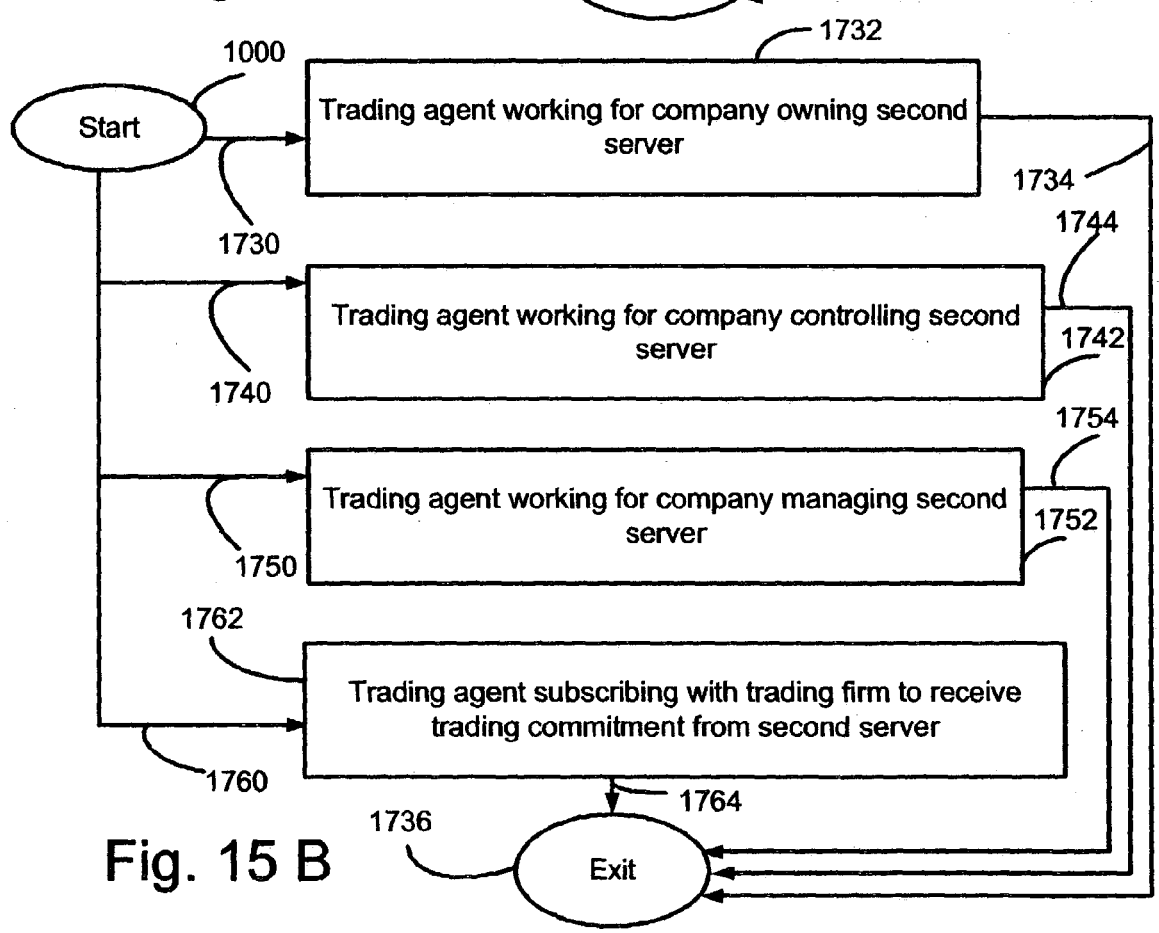

The invention further includes interactions 870 between at least the trading agent 856 and the second server 500, as in FIGS. 14E and 15B.
The trading agent 856 may work for 882 a trading firm 880 as in steps 1732, 1742, and 1752.
The trading firm 880 may own 870 the second server 500 as in step 1732.
The trading firm 880 may control 870 the second server 500 as in step 1742.
The trading firm 880 may manage 870 the second server 500 as in step 1752.
Alternatively, the trading agent 856 may subscribe 882 with trading firm 880 to receive 854 trading commitments 852 from the second server 500 as in step 1762.
Aspects of the invention further include trading firm 880 receiving 890 the firm revenue 888 based at least in part upon 886 the trade 860 as shown in FIG. 14E.

Figure 16A:
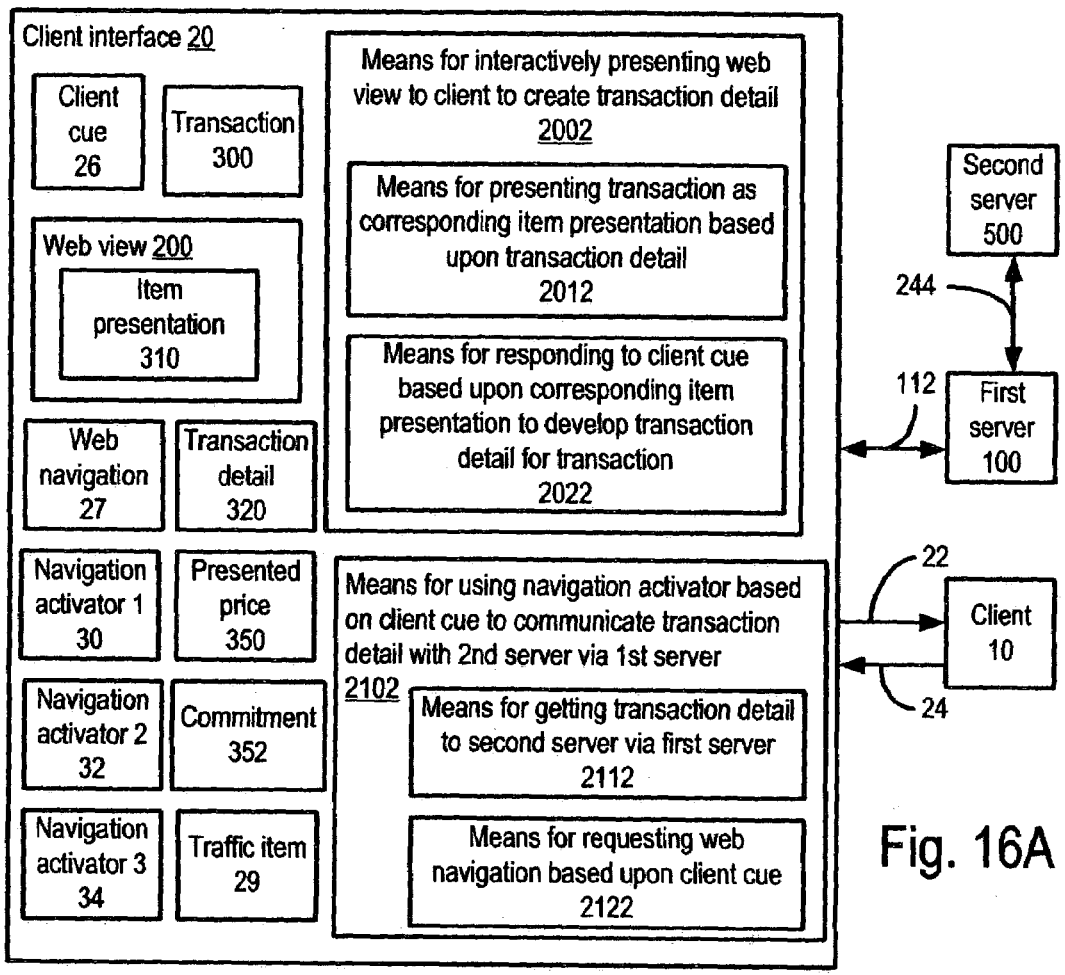
FIGS. 16A and 16B show processing business transactions for a client by a client interface communicating with the first server using the web view of FIG. 1.
Figure 16B:
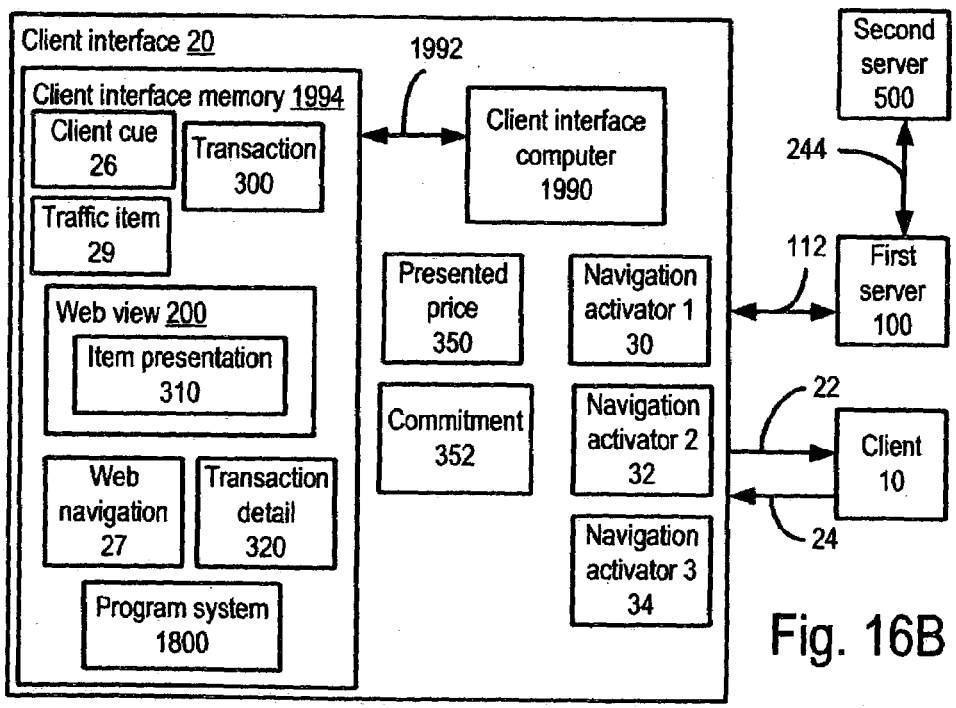

Aspects of the invention include processing a business transaction 300 for a client 10 by a client interface 20 communicating 112 with a first server 100 using a web view 200 as shown in FIGS. 1, 16A and 16B.
The web view 200 minimally includes the corresponding item presentation 310 of the transaction 300 in FIGS. 16A and 16B.
In certain embodiments, the web view 200 may further include the transaction 300, and/or the transaction detail 320 as shown in FIG. 1.
In FIG. 16A, the invention's method of processing transactions is shown implemented as the following means.
The means 2002 for interactively presenting the web view 200 to 22 the client 10 to create a transaction detail 320.

The means 2102 using at least one navigation activator 30 based upon a cue 26 from 24 the client 10 to communicate 112 the transaction detail 320 with a second server 500 via 244 the first server 100.

In FIG. 16B, the transaction 300, the corresponding item presentation 310, the transaction detail 320, and the web view 200 reside in a client interface memory 1994 accessibly coupled 1992 to a client interface computer 1990. The client interface memory 1994 also contains program steps in a program system 1800, which controls at least part of the client interface computer 1990 to implement the invention's method of processing business transactions 300 on the client side.

Preferably, the transaction detail 320 is a data component accessible by the web view 200 in the client interface 20. The data component preferably includes at least part of at least one member of the following: a memory, a file, a database, a cookie, a spreadsheet, a document, a folder, a directory, and an inferential graph.

Preferably, the invention's client interface 20 includes at least one navigation activator 30. Further, it is preferred that the client interface includes at least two more navigation activators 32 and 34, as in FIGS. 16A and 16B. The presentation of web navigators 30-34 may be implemented as actual buttons in the client interface, as well as regions in a visual display of the client interface 20 used to present information 22 to the client 10. The web navigators may also be presented as keywords in audio-interface-based, client interfaces ("Home", "Back", "Bookmarks", "Refresh", "New page" being examples of potential web navigator keywords which may be preferred).

It is apparent to one skilled in the art that implementing the method of the invention can be done using many different means. To clarify the invention, the details of FIGS. 16A and 16B, will be discussed in terms of the program system 1800 shown in FIG. 16B. Program steps included in program system 1800 will be discussed as implementations of the inventive method. This is not intended to limit the scope of the invention.

In FIG. 16A, the means for using at least one navigation activator 2102 includes the following means. Means 2112 for getting 244 the transaction detail 320 to the second server 500 via 112 the first server 100.

In FIGS. 16A and 16B, the client interface 20 provides 22 to client 10 a price indication 328 to create the presented price 750.

The price indication 328 in FIG. 3A is included in the transaction item 320.

Alternatively, the presented price 750 arrives at the client interface 20 from the second server 500 via 112 the first server 100. The client interface 20 presents 22 to the client 10 the presented price 750 for the purchase 302.

Figure 17A:
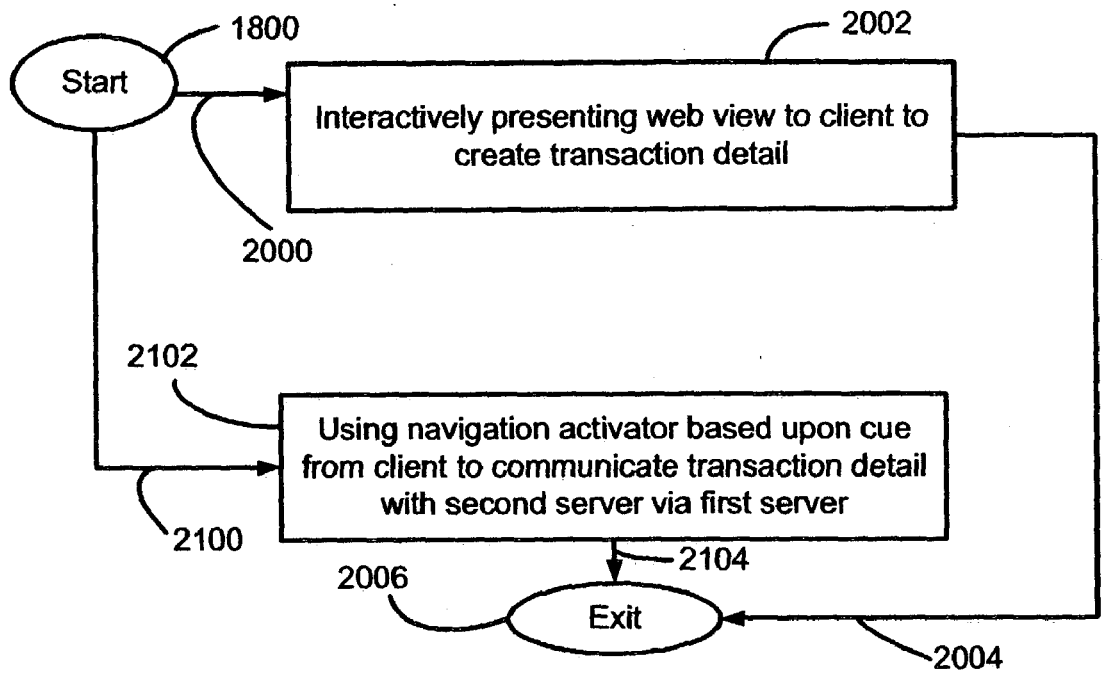
FIG. 17A shows processing the transaction as a program system of FIG. 16B.

FIG. 17A shows the invention processing the transaction 300 by client interface 20 for client 10 as a program system 1800 of FIG. 16B. In FIG. 16A, means are used to implement steps.

Step 2002 supports interactively presenting the web view 200 to the client 10 to create a transaction detail 320 as in FIGS. 16A and 16B.

Step 2102 supports using at least one navigation activator based upon a cue 26 from 24 the client 10 to communicate 112 the transaction detail 320 with a second server 500 via 244 the first server 100 as in FIGS. 16A and 16B.

Figure 17B:
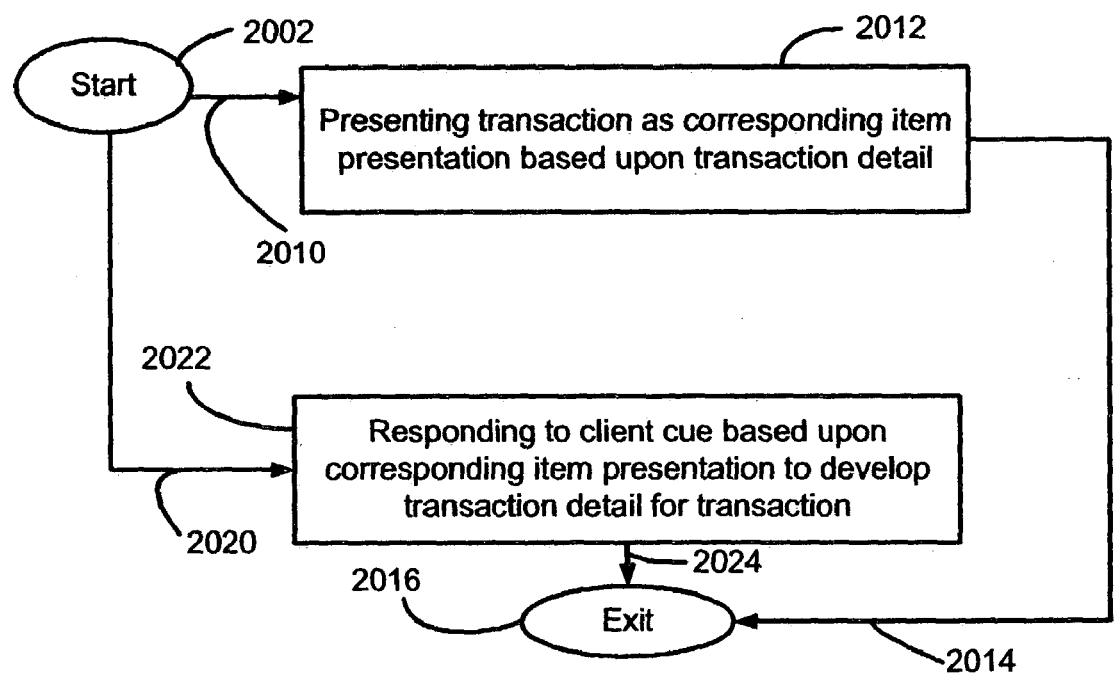
FIG. 17B shows a detail of FIG. 17A.

FIG. 17B shows interactively presenting 2002 the web view 200 to the client 10 to create the transaction detail 320. In FIG. 16A, means are used to implement steps.

Step 2012 supports presenting at least one of the transactions 300 as a corresponding item presentation 310 based upon the transaction detail 320. In certain aspects of the invention, the corresponding item presentation 310 may be presented 22 by the client 10 in either the web view 200 or a sub-window.

Step 2022 supports responding to the client cue 26 based upon the corresponding item presentation 310 to develop the transaction detail 320 for the transaction 300. Irrespective of whether the corresponding item presentation 310 is presented 22 in web view 200 or a sub-window, the client cue 26 develops the transaction detail 320.

Figure 18A:
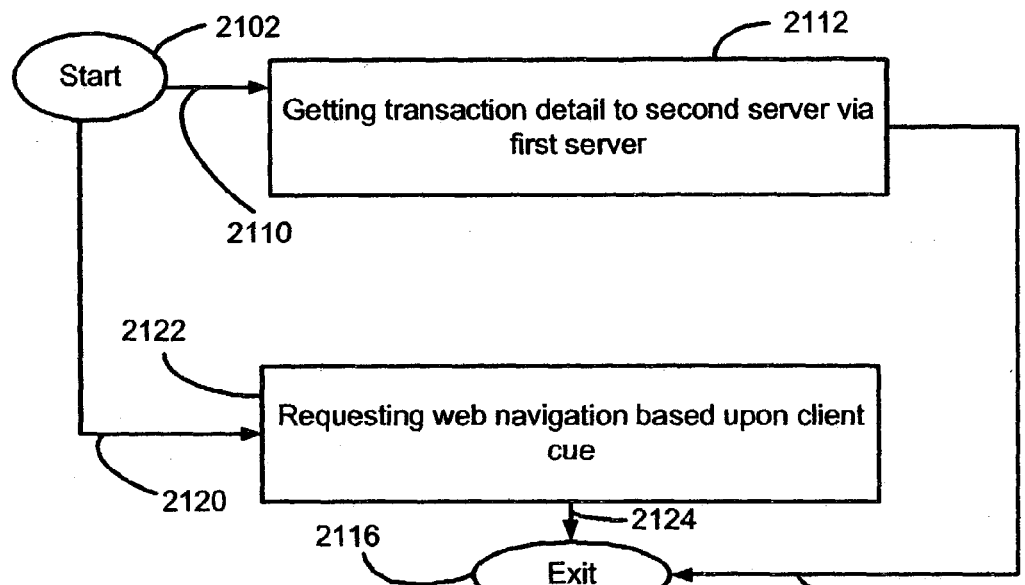
FIG. 18A shows using the navigation activator of FIG. 17A.

FIG. 18A shows using the navigation activator of step 2102 of FIG. 17A.

Step 2112 supports getting 244 the transaction detail 320 to the second server 500 via 112 the first server 100 as in FIG. 16A.

Step 2122 supports requesting a web navigation 27 based upon the client cue 26 as in FIG. 16A.

Figure 18B:
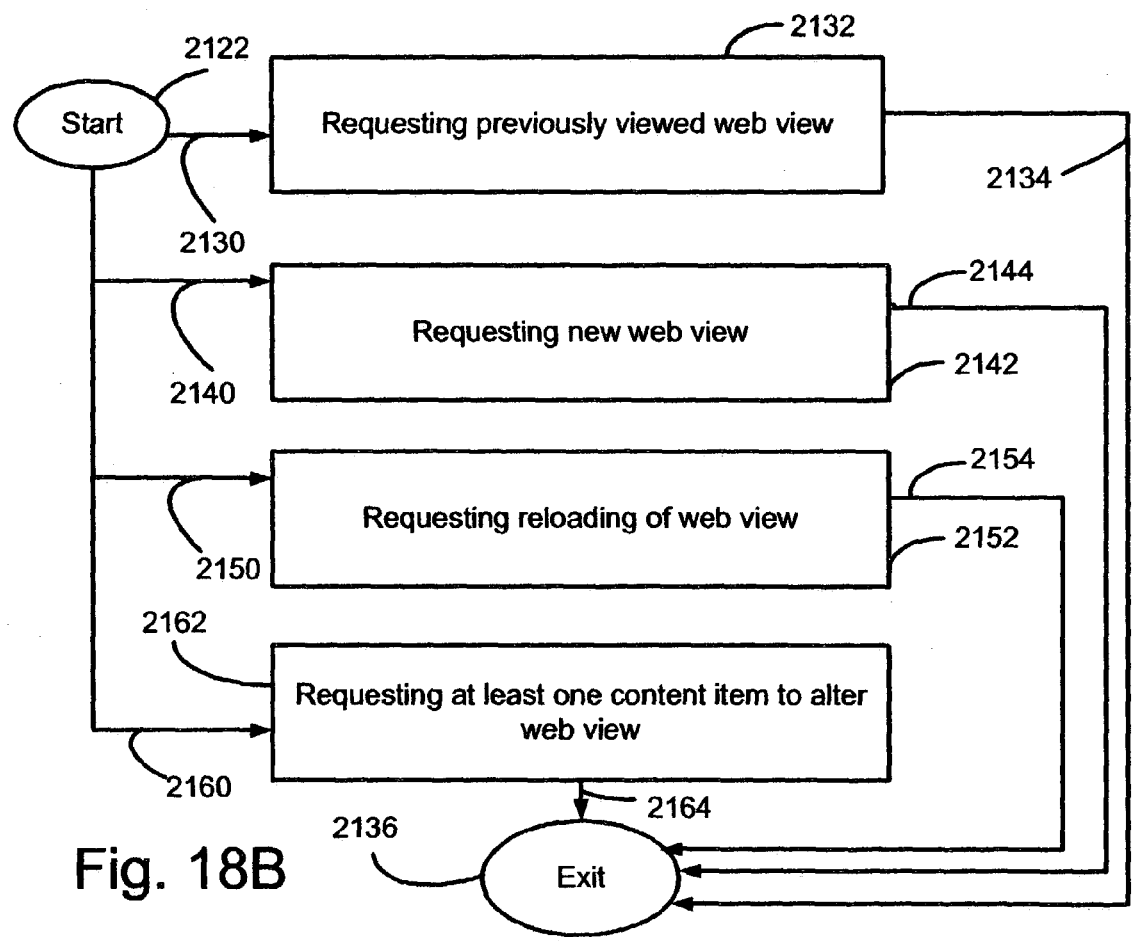
FIG. 18B shows requesting the web navigation of FIG. 18A.

FIG. 18B shows requesting the web navigation of step 2122 of FIG. 18A.

Step 2132 supports requesting a previously viewed web view.

A previously viewed web view may be requested from at least a bookmark list, and a history list.

Alternatively, a previously viewed web view may request at least one content item to alter the web view. The request may include sending a query request to a database interface, as well as sending a request and/or message to a news group or chat room.

The content may include any component of a web view.

Step 2142 supports requesting a new web view.

Step 2152 supports requesting a reloading of the web view.

Step 2162 supports requesting at least one content item to alter the web view. The content item may include, but is not limited to, text, one or more visual images, and/or a sub-page. Visual images may after include still frames, simulations, and motion sequences.

Aspects of the invention include the client interface 20 processing the transactions 300, the corresponding item presentations 310, and the transaction details 320 involving purchases shown in FIGS. 3A and 3B. Further, it is preferred that the second server 500 maintains 502 a shopping cart 700, including a shopping item 720, using the transaction detail 320 for the client 10 accessing 112 the first server 100 as in FIGS. 1 and 4.

Figure 19A:
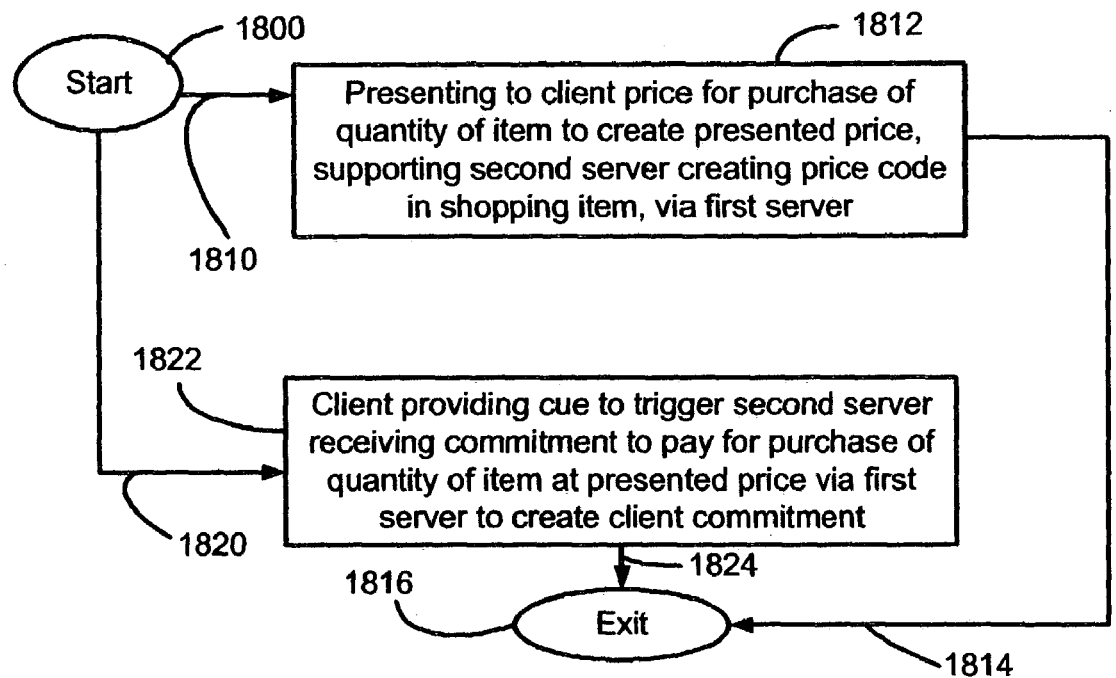
FIG. 19A shows a refinement of the method of FIGS. 16B and 17A.

FIG. 19A shows a refinement of the business transaction processing, as in program system 1800 of FIGS. 16B and 17A.

Step 1812 supports presenting 22 to the client 10 a price 308 for the purchase 302 of the quantity 304 of the item 306 to create a presented price 750. This further supports the second server 500 creating a price code 728 included in the shopping item 720, via 244 the first server 100 as in FIGS. 1, 3A, and 4.

Step 1822 supports the client 10 providing at least one of the cues 26 to trigger the second server 500 receiving a commitment. The client 10 commits to pay for the purchase 302 of the quantity 304 of the item 306 at the presented price 750 via 112 and 244 through the first server 100, creating a client commitment 752 as in FIGS. 1, 3A, and 4.

Figure 19B:
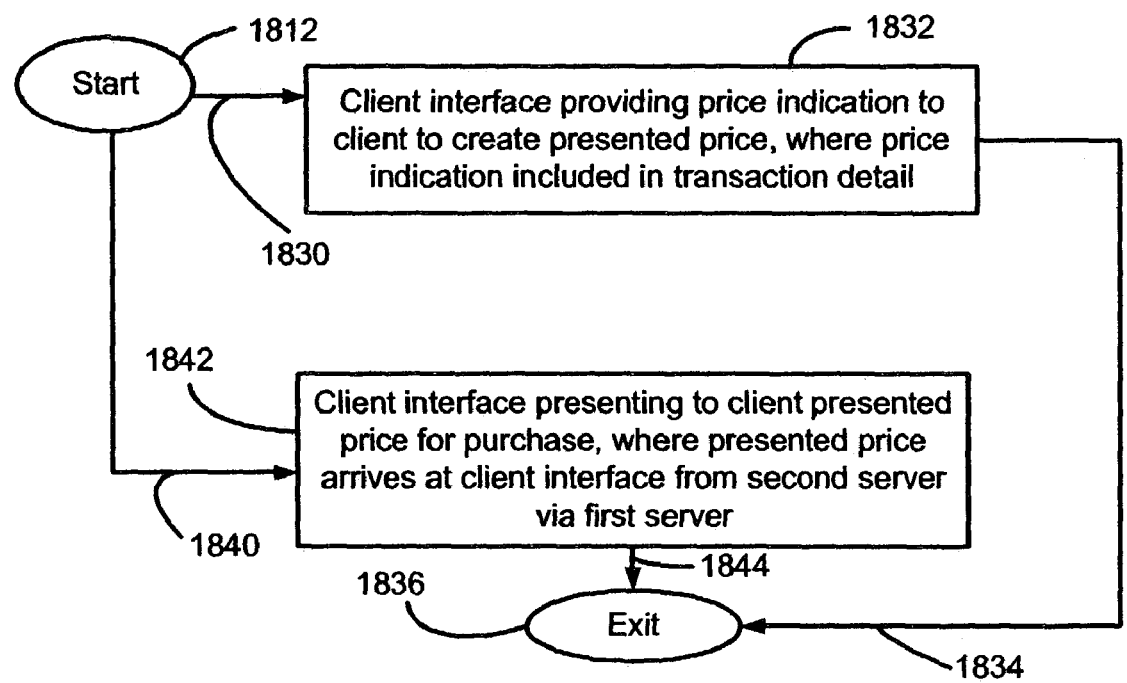
FIG. 19B shows a refinement of a step of FIG. 17A.

FIG. 19B shows a refinement of presenting 1812 to the client a price as in FIG. 17A.

Step 1832 supports the client interface 20 providing 22 to client 10 a price indication 328 to create the presented price 750 shown in FIGS. 3F, 4, 16A and 16B. The price indication 328 is included in the transaction item 320.

Step 1842 supports the client interface 20 presenting 22 to the client 10 the presented price 750 for the purchase 302. The presented price 750 arrives at the client interface 20 from the second server 500 via 112 the first server 100 as in FIGS. 1, 3A and 4.

The invention includes the client interface 20 processing transactions 300 with at least one participant 332 for an event 336 described by at least one event descriptor 334 as in FIG. 8B.

Figure 20A:
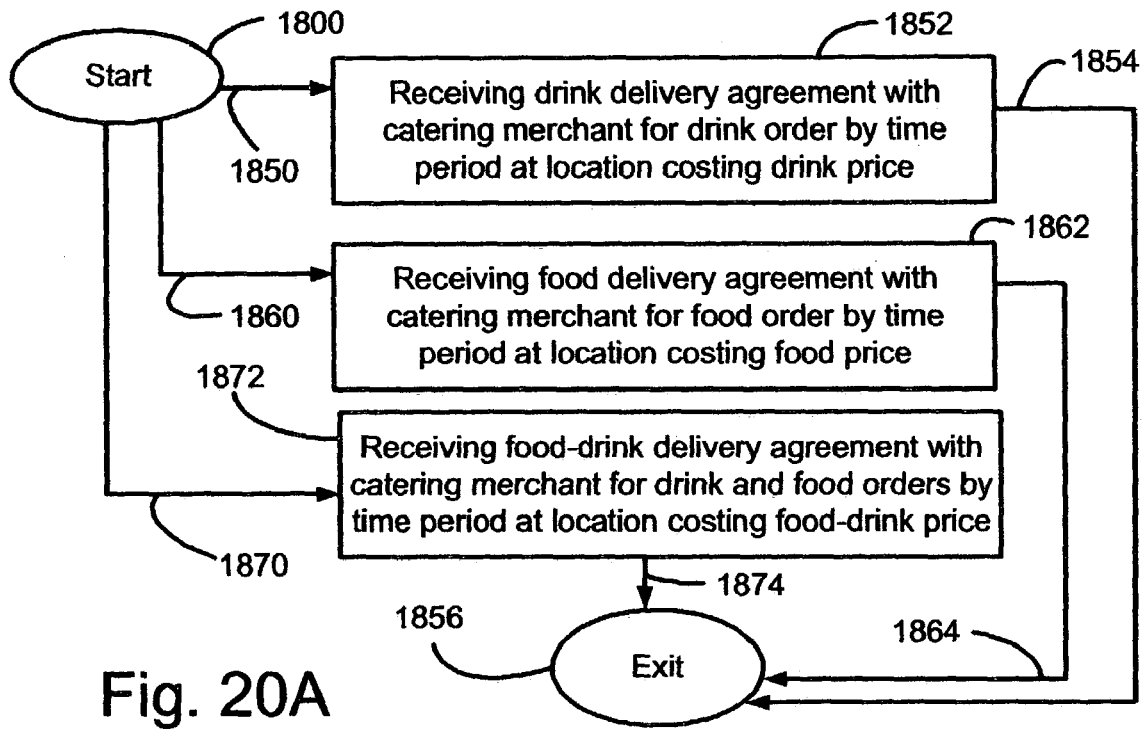
FIG. 20A shows the client interface method of FIG. 16B receiving food and drink agreements with a catering merchant of FIG. 9.

FIG. 20A shows the client 10 receiving food and drink agreements 782-1 to 782-3 with the catering merchant 786 of FIG. 9.

Step 1852 supports receiving from the second server 500 a drink delivery agreement 782-1 with a catering merchant 786 for the drink order 366 in the time period 358 at the location 352 costing a drink price 405 as in FIGS. 8B, 8E, and 9.

Step 1862 supports receiving from the second server 500 a food delivery agreement 782-2 with the catering merchant 786 for the food order 368 in the time period 358 at the location 352 costing a food price 403 as in FIGS. 8B, 8E, and 9.

Step 1872 supports receiving from the second server 500 a food-drink delivery agreement 782-3 with a catering merchant 786 for the drink order 366 and for the food order 368 in the time period 358 at the location 352 costing a food-drink price 407 as in FIGS. 8B, 8E, and 9.

Figure 20B:
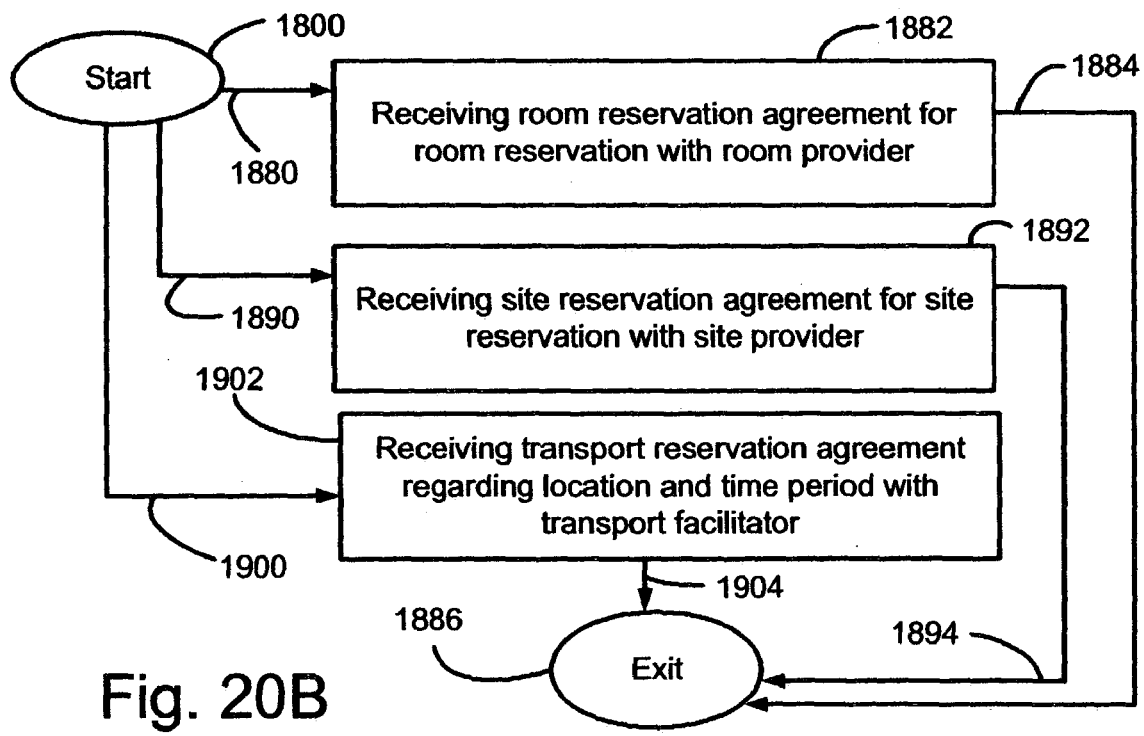
FIG. 20B shows the client method of FIG. 16B receiving room reservation agreements, site reservation agreements, and transport reservation agreements as in FIG. 9.

FIG. 20B shows the client interface method of FIG. 16B further receiving one or more room reservation agreements 812, site reservation agreements 822, and/or transport reservation agreements 832 as in FIG. 9.

Step 1882 supports receiving from the second server 500 a room reservation agreement 812, shown in FIG. 9, for the room reservation 362 of FIG. 8B with a room provider 816.

Step 1892 supports receiving from the second server 500 a site reservation agreement 822 for the site reservation 364 with a site provider 826.

Step 1902 supports receiving from the second server 500 a transport reservation agreement 832 regarding the location 352 and the time period 358 with a transport facilitator 836.

Figure 21A:
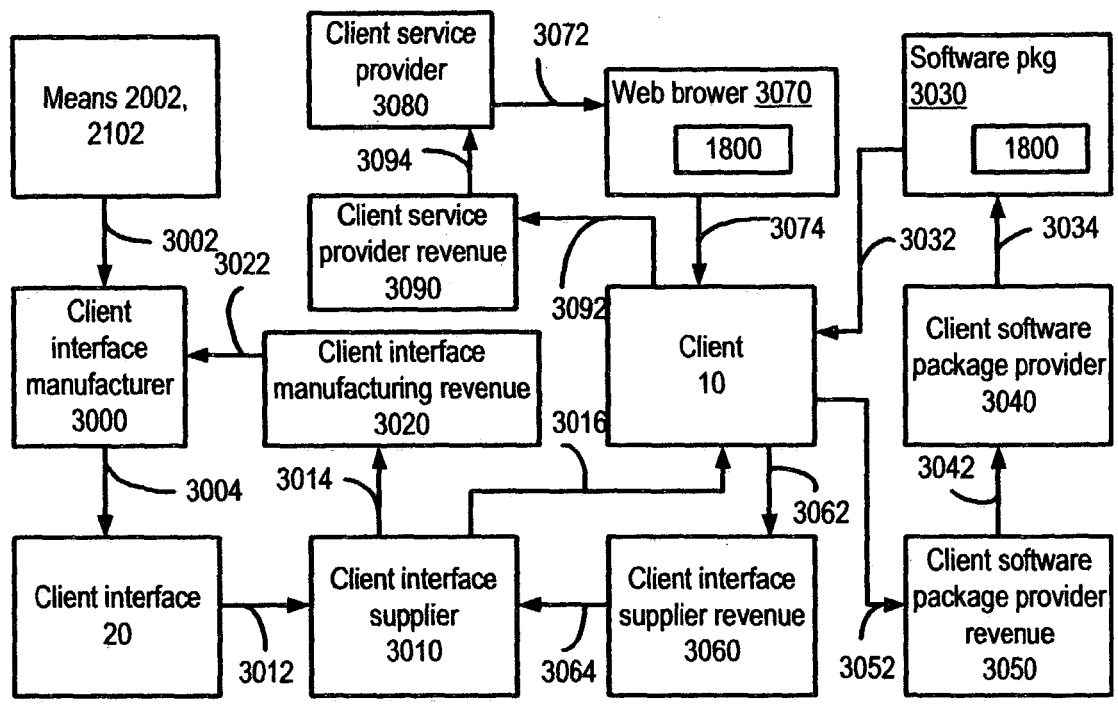
FIG. 21A shows the flow of products, contributors and revenue for a business method providing an implementation of the client business transaction process shown in FIGS. 16A to 20B.
Figure 21B:
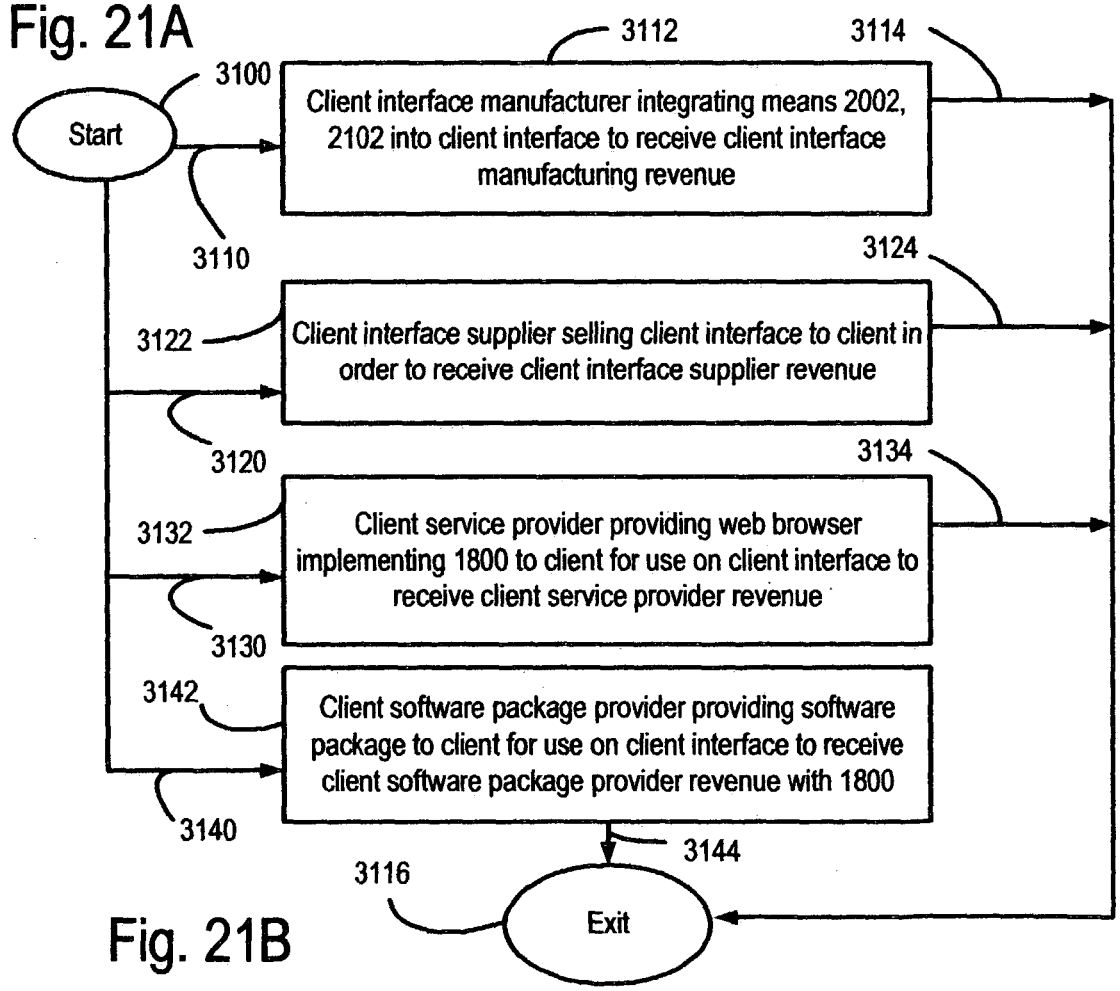
FIG. 21B shows a business method providing an implementation of the client business transaction process shown in FIGS. 16A to 20B.

FIG. 21A shows a product, contributor and revenue flow of a business method 3100 of FIG. 21B implementing the client business transaction process shown in FIGS. 16A to 20B. Aspects of the invention include at least one of the following shown in FIGS. 21A and 21B.

Step 3112 supports a client interface manufacturer 3000 integrating 3002 means 2002 and 2102, of FIGS. 16A and 17A, into 3004 the client interface 20 to receive 3022 a client interface manufacturing revenue 3020.

Step 3122 supports a client interface supplier 3010 selling 3016 the client interface 20 to the client 10 in order to receive 3064 a client interface supplier revenue 3060. Often, the client interface supplier 3010 receives 3012 the client interface 20 from 3004 the client interface manufacturer 3000.

Step 3132 supports a client service provider 3080 providing 3072 a web browser 3070 to 3074 the client 10 for use on the client interface 20 to receive 3094 a client service provider revenue 3090. The web browser 3070 implements the client interface method of transacting business 1800, shown in FIGS. 16B and 17A.

Step 3142 supports a client software package provider 3040 providing 3034 a software package 3030 to 3032 the client 10 for use on the client interface 20 to receive 3042 client software package provider revenue 3050. The software package 3030 includes means for implementing the client interface method of business transactions 1800.

FIG. 21A also shows a simplified revenue flow. Aspects of the invention include the following.

Client interface manufacturer 3000 may also act as the client interface supplier 3010. Examples include the following: A computer manufacturer 3000 may directly supply 3010 some clients 10. A telephone handset manufacturer 3000 may directly supply 3010 some clients 10.

The client 10 is shown as the source of revenue through arrows 3052, 3062 and 3092, while in practice, often a group, agency, family or company may actually contribute the revenue. In any of these client source revenue situations, it is the existence and capability of the invention, provided to the client 10, that at least partly causes the revenue to exist.

In FIG. 21A, the client software package provider 3050 may also act as the client service provider 3080.

In FIG. 21A, the web browser 3070 may be included in the software package 3030.

In FIG. 21A, the web browser 3070 and/or software package 3080 may be embodied in any of the following:

A removable memory device, often preferred to be a non-volatile memory device.

A collection of one or more data items available for download on a server to the client 10, which may further require the permission of client service provider 3080 and/or software package provider 3040, respectively.

A module, providing means 2002 and means 2102, integrated into client interface 20. The module may further require registration by the client 10 with client service provider 3080 and/or software package provider 3040, respectively. The client interface manufacturer 3000 may integrate these means as part of the process to receive the client interface manufacturing revenue 3020.

These aspects of the invention include the client interface manufacturing revenue 3020, the client interface supplier revenue 3060, the client service provider revenue 3090, and the client software package provider revenue 3050, as products of the technical processes shown in FIGS. 21A and 21B.

The web browser 3070 and the software package 3030, are products of the technical process of generating revenue of FIGS. 21A and 21B, and rely, at least in part, upon the aspects of the invention's client method of business transactions to generate those revenues.

Figure 22A:
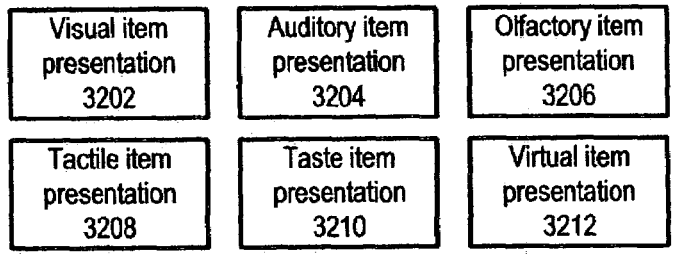
FIGS. 22A to 22F show basic examples of item presentations and client cues for the client interface within the scope of the invention.
Figure 22B:
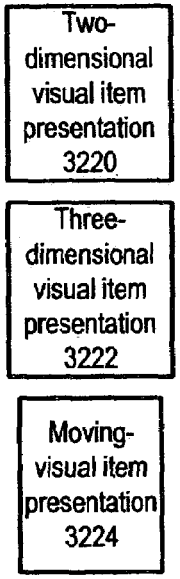
Figure 22C:
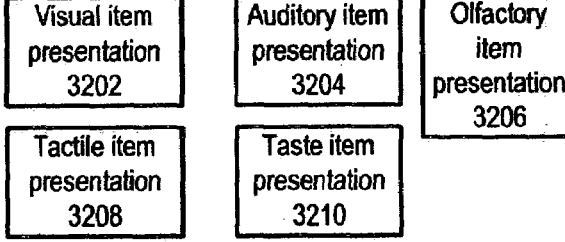

FIGS. 22A to 22C show a basic summary of the item presentations 310 of the client interface 20 within the scope of the invention.

The corresponding item presentation 310 of FIGS. 16A-16B includes at least one member of an item presentation type collection 3200 as in FIG. 22A, including: visual item presentation 3202, auditory item presentation 3204, olfactory item presentation 3206, tactile item presentation 3208, taste item presentation 3210, and virtual item presentation 3212. Each presentation type has been at least experimentally demonstrated as of the time of this document's filing.

The visual item presentation 3202 as in FIG. 22B includes at least one member of the collection comprising a two-dimensional visual item presentation 3220, a three-dimensional visual item presentation 3222, and a moving-visual item presentation 3224.

The virtual item presentation 3212 as in FIG. 22C includes at least two members of the remaining item presentation type collection members: visual item presentation 3202, auditory item presentation 3204, olfactory item presentation 3206, tactile item presentation 3208, and taste item presentation 3210.

Figure 22D:
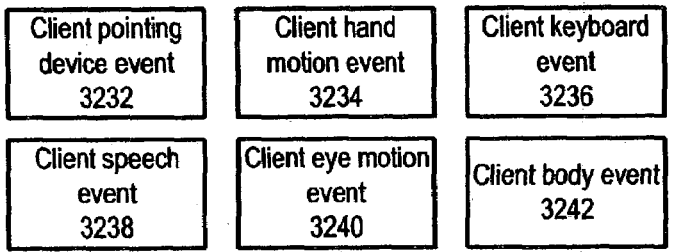

In FIG. 22D, the client cue 26 of FIGS. 16A and 16B, includes at least one instance of a client cue primitive collection 3230.

The client cue primitive collection 3230 as in FIG. 22D includes a client pointing device event 3232, a client hand motion event 3234, a client keyboard event 3236, a client speech event 3238, a client eye motion event 3240, and a client body event 3242.

Figure 22E:
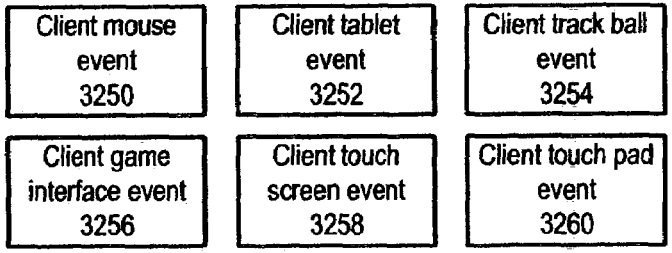
Figure 22F:
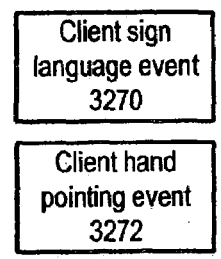

The client pointing device event 3232 as in FIG. 22E includes a client mouse event 3250, a client tablet event 3252, a client track ball event 3254, a client game interface event 3256, a client touch screen event 3258, and a client touch pad event 3260. The client hand motion event 3234 as in FIG. 22F includes a client sign language event 3270, and a client hand pointing event 3272.

As used herein, the client speech event 3238 includes a recognition event of an auditory pattern from the client, not shown in FIGS. 22A to 22F. However, the recognition event can be based upon a natural language 3304 of FIG. 23C. Multiple natural languages may be recognizable, and may be configured for the client interface 20 by the client 10.

The steps of the various methods of the invention's aspects may also be implemented using at least one instance of a member of the computer language collection 3300 as in FIG. 23A.

Members of the computer language collection 3300 as in FIG. 23A include, but are not limited to, script languages 3302, natural languages 3304, logic programming languages 3306, and interpreted languages 3308.

Script languages 3302 as in FIG. 23B include, but are not limited to, all versions of java 3310, html 3312, basic 3314, lisp 3316, perl 3318, object-oriented languages 3320, procedural languages 3322, and stream-oriented languages 3324.

Natural languages 3304 as in FIG. 23C include, but are not limited to, all versions of indo-european languages 3330, sino-tibetan languages 3332, pacific-based languages 3334, amerindian languages 3336, and african languages 3338. Natural languages 3304 may be seen to include all human languages, whether actively used by cultures today or not, whether arising from ordinary human interactive evolution, or consciously constructed, such as Esperanto.

Logic programming languages 3306 as in FIG. 23D include, but are not limited to, all versions of prolog 3340, and constraint programming languages 3342.

Interpreted languages 3308 as in FIG. 23E includes, but are not limited to, all versions of byte-code languages 3344, and machine languages for micro-processors 3346.

Byte-code languages 3344 as in FIG. 23F include, but are not limited to, versions of java-code 3350, p-code 3352, mpeg 3354, cgi 3356, and the warren machine 3358.

Machine languages include, but are not limited to, at least one member of the collection comprising a loader-format, a linker-format, and a compressed-format.

Micro-processors include, but are not limited to, all versions of at least one of the following: an eight bit, sixteen bit, thirty-two bit, or sixty-four bit microprocessor, a digital signal processor, and/or a member of a micro-processor family.

Micro-processor families include, but is not limited to, the ARM processor family, the x86 processor family, the 68K processor family, the MIPS processor family, and the PowerPC processor family.

Figures 24A, 24B:
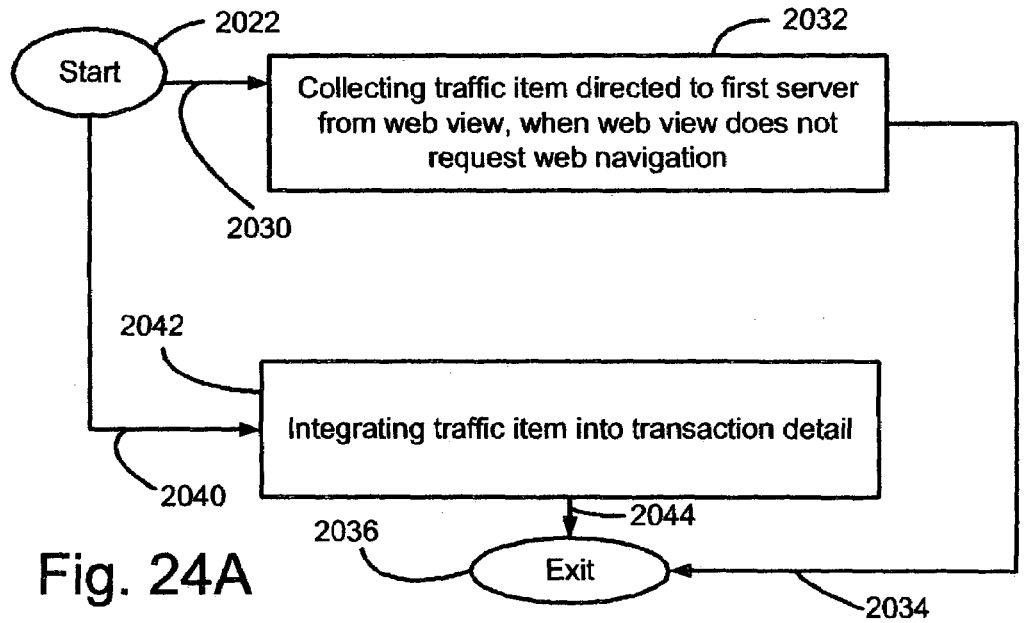
FIG. 24A shows the client interface responding to the client cue of FIG. 16A.
FIG. 24B shows preferred item presentations and navigation activators in a web view.

FIG. 24A shows responding 2022 to the client cue 26 of FIG. 16A and 16B.

Step 2032 supports collecting a traffic item 29 directed to the first server 100 from a web view 200, when the web view 200 does not request a web navigation 27.

Step 2042 supports integrating the traffic item 29 into the transaction detail 320.

The web view 200 and/or a web browser 3070 and/or software package 3030, of FIG. 21A, may implement the steps shown in FIG. 24A.

It may be further preferred that first server 100 filter the transaction detail 320 to remove traffic items that are irrelevant to the second server 500, sending only the relevant parts of transaction detail 320.

FIG. 24B shows preferred item presentations 310 and navigation activators 30-39 in a web view 200. The web view 200 includes six navigation activators.

When client 10 triggers the navigation activator Back 30, the client interface 20 requests 2132 a previously viewed web view from the first server 100, as in FIGS. 1 and 18B.

When client 10 triggers the navigation activator Bookmark 32, the client interface 20 also requests 2132 a previously viewed web view from the first server 100, as in FIGS. 1 and 18B.

When client 10 triggers the navigation activator Address 34, the client interface 20 requests 2142 a new web view from the first server 100, as in FIGS. 1 and 18B.

When client 10 triggers the navigation activator Checkout 36, the client interface 20 requests 2142 a new web view from the first server 100 involving the shopping cart 700 maintained by second server 500, as in FIGS. 1, 4 and 18B.

When client 10 triggers the navigation activator Product Catalog 38, the client interface 20 requests 2152 a reloading of web view 200 from the first server 100, as in FIGS. 1 and 18B.

When client 10 triggers the navigation activator Refresh 39, the client interface 20 requests 2152 a reloading of web view 200 from the first server 100, as in FIGS. 1 and 18B.

In FIG. 24B, when client 10 triggers the button View Cart 40, the client interface 20 preferably performs the following requests:

The client interface requests 2162 the contents of the shopping cart 700 via the first server 100 from second server 500, as in FIGS. 1, 4 and 18B.

The client interface requests 2142 a new web view from the first server 100, involving the shopping cart 700 maintained by second server 500, as in FIGS. 1, 4 and 18B.

In certain alternative embodiments, the client interface 20 may maintain a version of the shopping cart 700 locally.

When client 10 triggers the button View Cart 40 in FIG. 24B, the client interface 20 may provide the shopping cart information without making requests of the first server 100.

When a navigation activator 30-39 is used, the invention performs the following steps.

Step 2112 supports the client interface 20 getting the transaction detail 320 to the second server 500 via the first server 100, as in FIGS. 1, 4, 16A, and 18A.

Step 2122 supports the client interface 20 requesting web navigation 27 based upon client cue 26.

These two operations may be concurrent, and may not depend upon each other in general.

In certain embodiments there may be a preference for getting the transaction detail 320 to the second server 500 before requesting web navigation from the first server 100.

In FIG. 24B, web view 200 may be implemented as a combination of web browser 3070 of FIG. 21A, and one or more web pages.

The web browser 3070 may preferably implement the filtering 2032, integrating 2042, getting 2112 and requesting 2122 operations of FIGS. 16A, 18A and 24A.

At least one of the web pages then preferably supports interactively presenting 2002 the transaction.

Figure 25A:
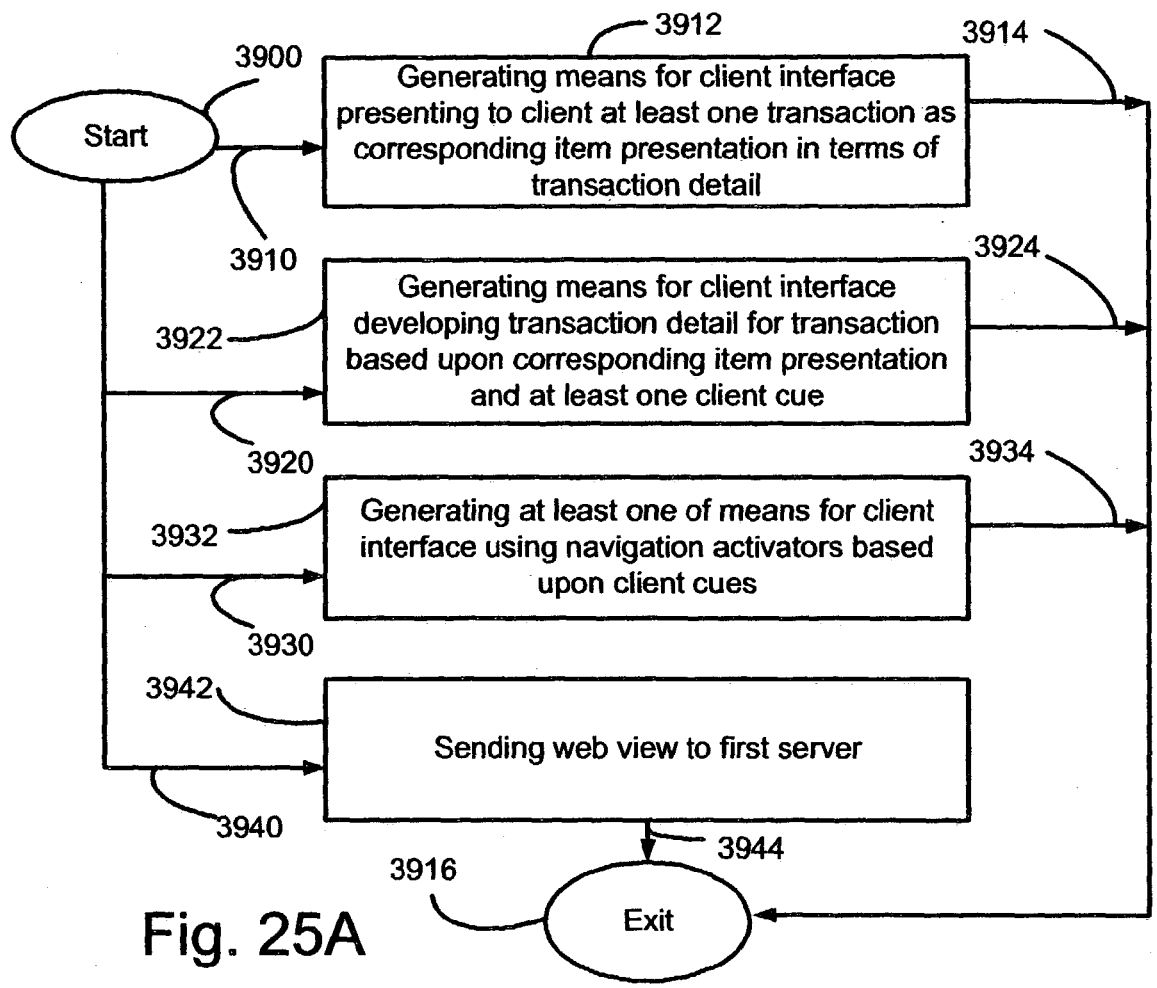
FIG. 25A shows a method generating the web view of FIGS. 1, 16A, and 16B, preferably for the first server to provide to the client interface.

Aspects of the invention include a method 3900 of generating the web view 200 of FIGS. 1, 16A, and 16B, preferably for the first server 100 to provide the client interface 20, as in FIG. 25A.

Step 3912 supports generating a means 2012 for the client interface 20 presenting to the client 10 at least one transaction 300 as a corresponding item presentation 310 in terms of a transaction detail 320.

Step 3922 supports generating a means 2022 for the client interface 20 developing the transaction detail 320 for the transaction 300 based upon the corresponding item presentation 310 and based upon at least one cue 26 from 24 the client 10.

Step 3932 supports generating at least one of the means 2102 for the client interface 20 using at least one navigation activator 30-39 based upon at least one of the client cues 26.

The invention preferably further includes sending the web view 200 to the first server 100, shown in step 3942.

Figure 25B:
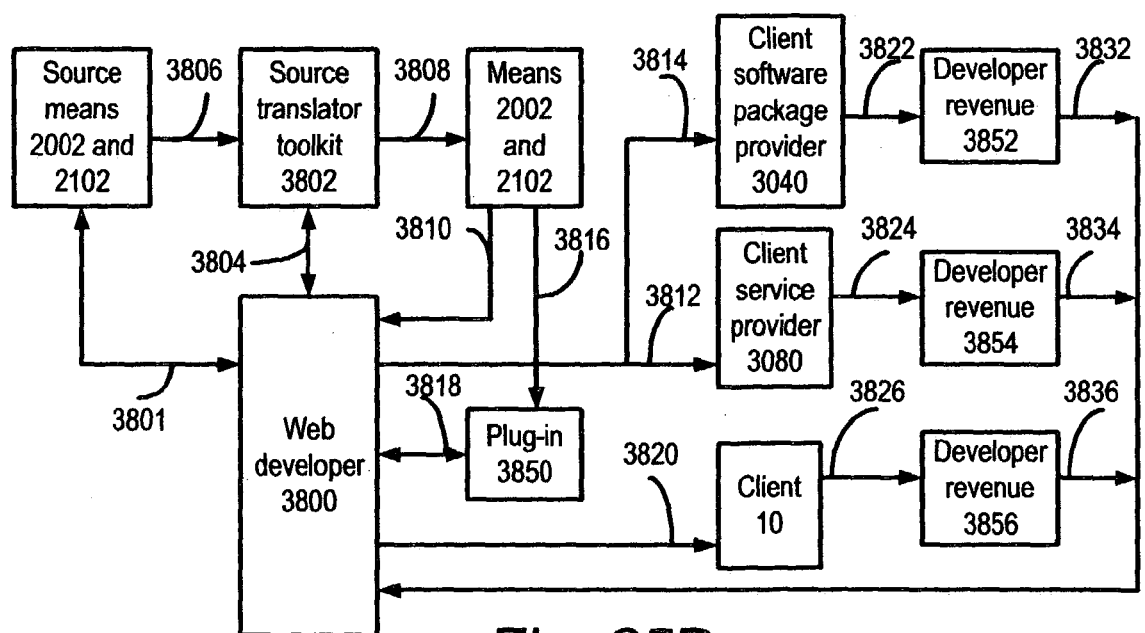
FIG. 25B shows the development of means implementing the client side invention as a business method.

Aspects of the invention shown in FIG. 25B, further include the business flow for a web developer 3800 generating 3900, as in FIG. 25A, at least part of at least one of web view 200, web browser 3070, and/or software package 3030 supporting the client interface business method 1800.

Web developer 3800 interactively creates 3801 source means 2002 and 2102.

Web developer 3800 operates 3804 a source translator toolkit 3802, which receives 3806 source means 2002 and 2102 to create 3808 means 2002 and 2102. Operating 3804 the source translator toolkit 3802 is often interactive, with warnings and errors reported by the toolkit, stimulating the web developer 3800 to revise 3801 source means 2002 and 2102.

This process provides 3810 means 2002 and 2102 to the web developer 3800 as a product.

The source means 2002 and 2102 may be implemented in one or more computer languages as in FIG. 23.

In aspects of the invention shown in FIG. 25B, the means 2002 and 2102 are used as a product by the web developer 3800 to generate revenue in at least one of the following ways:

Web developer 3800 provides 3812 the means 2002 and 2102 to client service provider 3080 of FIG. 21A to induce 3824 the client service provider 3080 sending 3834 the developer revenue 3854.

Web developer 3800 provides 3814 the means 2002 and 2102 to client software package provider 3040 of FIG. 21A to induce 3822 the client service provider 3080 sending 3832 the developer revenue 3852.

Means 2002 and 2102 are integrated 3816 into a plug-in 3850 as a product by 3818 the web developer 3800. The web developer provides 3820 the plug-in 3850 to the client 10 of FIG. 21A to induce 3826 the client sending 3836 the developer revenue 3856.

The developer revenues 3852, 3854, and 3856, are each products of the process discussed in FIG. 25B.

A source translator toolkit 3802 of FIG. 25B may include, but is not limited to, any of the following: visual programming tools, translators between one or more computer languages, library management tools, linkage editors, revision control management systems, makefiles, regression test systems, and acceptance test tools and systems. The source translator toolkit 3802 may be integrated into an environment supporting creating and editing 3801.

Integration 3816 of means 2002 and 2102, shown in FIG. 25B, may include, but is not limited to, any combination of the following:

physical package generation of the means 2002 and 2102 to create the plug-in 3850, compression of the means 2002 and 2102 to at least partly create the plug-in 3850, and linking the means 2002 and 2102 to other means to create the plug-in 3850.

The preceding embodiments have been provided by way of example and are not meant to constrain the scope of the following claims.

The invention claimed is:

1. A method for transacting business based upon a web view, comprising the steps of:
   interacting by a first server with a client via a client interface; and
   transmitting by said first server said web view to said client interface, wherein said web view includes:
      means for said client interface presenting to said client at least one transaction as a corresponding item presentation in terms of a transaction detail;
      means for said client interface developing said transaction detail without requiring communication from said first server for said transaction based upon said corresponding item presentation and based upon at least one cue from said client;
      means for said client interface using at least one navigation activator based upon at least one of said client cues, further including:
      means for sending said transaction detail from said client interface to a second server via said first server before performing means for requesting a web navigation.

2. The method of claim 1, further comprising at least one member of a collection comprising the steps of:
   retrieving at least part of said web view from a storage system;
   generating at least part of said web view from at least one direction from the client interface based upon a said cue from said client; and
   receiving at least part of said web view from a database system.

3. The method of claim 2, wherein said first server is essentially distinct from at least one member of the collection comprising said storage system and said database system.

4. The method of claim 2, wherein said first server includes at least one member of the collection comprising said storage system and said database system.

5. The method of claim 2, wherein said first server is coupled to at least one member of the collection comprising said storage system and said database system.

6. The method of claim 1, wherein said first server is the same as said second server.

7. The method of claim 1, wherein each member of the collection comprising:
sending said transaction detail to said second server via first server from said client interface, and
providing said web view to said client interface.

8. The method of claim 1, wherein said transaction detail includes a purchase involving a quantity of an item; and wherein said corresponding item presentation includes a designation of said item and a designation of said quantity; further comprising the step of:
maintaining by said second server a shopping cart, including a shopping item, using said transaction detail for said client accessing said first server, further comprising the step of:
developing by said second server said shopping item included in said shopping cart, based upon said transaction detail.

9. The method of claim 8, wherein the step developing said shopping item is further comprised of the steps of:
using said transaction detail to create a purchase designation included in said shopping item; sing said item indication of said transaction detail to create an item code included in said shopping item; and
using said quantity indication of said transaction detail to create a quantity code included in said shopping item.

10. The method of claim 8, further comprising the steps of:
establishing by said second server a price for said purchase of said quantity of said item, to create a price code included in said shopping item, presented to said client via said first server and said client interface to create a presented price;
receiving at said second server a commitment to pay for said purchase of said quantity of said item at said presented price from said client via said client interface and said first server to create a client commitment;
confirming by said second server said client commitment via a financial interface, based upon an information about said client included in said shopping cart, to create a financial confirmation;
creating by said second server a purchase agreement for said quantity of said item at said presented price based upon said financial confirmation; and
notifying by said second server a merchant of said purchase agreement.

11. The method of claim 10, wherein the step of said second server establishing said price is further comprised of a member of the collection comprising the steps of:
using by said second server a price indication included in said transaction item to create said presented price; and
sending by said second server said presented price for said purchase to said client interface for presentation to said client.

12. The method of claim 10, wherein the step of notifying by said second server said merchant is further comprised of at least one member of the collection comprising the steps of:
sending by said second server said purchase agreement via a merchant interface to notify said merchant; and
posting by said second server said purchase agreement in a task schedule for said merchant.

13. The method of claim 10, further comprising at least one member of a collection comprising:
said merchant at least partly owning said second server;
said merchant at least partly controlling said second server; said merchant at least partly managing said second server; and
said merchant subscribing to be notified by said second server.

14. The method of claim 10, further comprising the steps of:
sending by said second server a financial action to create a purchase revenue for said merchant, based upon said purchase agreement via said financial interface; and
receiving at said merchant said purchase revenue based upon said financial action.

15. The method of claim 14, wherein a server collection is comprised of said first server and said second server; wherein said method is further comprised of the steps of:
administering a by service provider at least one of said server collection members; and
receiving at said service provider a server service fee based upon said purchase revenue.

16. The method of claim 8, wherein at least one of said steps uses at least one member of a second server collection comprising:
means for controlling a second server computer by a second server program system;
means for controlling a second server finite state machine;
means for controlling a second server neural network; and
means for controlling a second server inferential engine.

17. The method of claim 1, wherein the means for requesting said web navigation is further comprised of at least one member of the collection comprising:
means for requesting a previously viewed web view;
means for requesting a new web view;
means for requesting a reloading of said web view; and
means for requesting content item to alter said web view.

18. The method of claim 1 further comprising:
using said transaction detail sent to said second server via first server from said client interface, wherein said transaction detail includes at least one event described by at least one event descriptor, wherein said event descriptor includes at least one member of the description collection comprising a location, a phone number, a conference call center, a time period, a room reservation, a site reservation, a drink order, a food order, and a transport reservation, wherein said event includes at least one member of a event type collection including a meeting, a multi-site meeting, a distant conference, and a vacation, wherein said method is comprised of at least one member of the collection comprising the steps of:
generating a drink delivery agreement with a catering merchant for said drink order in said time period at said location costing a drink price;
generating a food delivery agreement with said catering merchant for said food order in said time period at said location costing a food price;

generating a food-drink delivery agreement with said catering merchant for said drink order and for said food order in said time period at said location costing a food-drink price;

making a room reservation agreement for said room reservation with a room provider making a site reservation agreement for said site reservation with a site provider;

making a transport reservation agreement regarding said location and said time period with a transport facilitator; and executing by a transport provider at least part of said transport reservation agreement, wherein a delivery agreement collection is comprised of said drink delivery agreement, said food delivery agreement, and said food-drink delivery agreement.

19. The method of claim 18, wherein said transaction further includes at least one participant.

20. The method of claim 18, further comprising at least one member of the collection comprising the steps of:

receiving by said catering merchant a catering revenue based upon at least one of said delivery agreement members;

receiving by said room provider a room revenue based at least in part upon said room reservation agreement;

receiving by said site receiving a site revenue based at least in part upon said site reservation agreement;

receiving by said transport facilitator a transport assistance fee based upon said transport reservation agreement; and receiving by said transport provider a transport revenue based at least partly upon said transport provider executing said transport reservation agreement.

21. The method of claim 18, wherein said transport provider is essentially said transport facilitator.

22. The method of claim 1, further comprising:

using said transaction detail received by said second server via first server from said client interface, wherein said transaction includes at least one financial request for an amount, wherein said financial request is a member of a financial request collection comprising a deposit, a withdrawal, and a fee, and wherein said transaction detail reflects said transaction containing a first financial request at said first amount;

sending by said second server a financial action to a financial institution based upon said transaction detail received by said second server; and providing by said financial institution a financial service based upon said financial action; wherein said financial service reflects said transaction detail, including a first service request reflecting said first financial request at first service amount reflecting said first amount for an account identified with said client.

23. The method of claim 22, wherein said transaction further includes an account.

24. The method of claim 22, wherein the step of said second server sending said financial action is further comprised of the step of sending by said second server said financial action via said financial interface to said financial institution.

25. The method of claim 22, wherein said account identified with said client is provided by said transaction detail reflecting an account included in said transaction.

26. The method of claim 22, further comprising the step of:

receiving by said financial institution a financial service revenue based at least partly upon said financial service.

27. The method of claim 1, further comprising:

using said transaction detail received by said second server via first server from said client interface, wherein said transaction detail includes at least one trading action of a commodity for a quantity, meeting, and a trading condition, wherein each of said trading actions included in said transaction detail reflects one said transactions, wherein said trading action is a member of a trading action collection including a buy-order and a sell-order; wherein said trading condition, when said trading action is said buy-order, includes a maximum-price; and wherein said trading condition, when said trading action is said sell-order, includes a minimum-price;

sending by said second server a trading commitment, based upon said transaction detail to a trading agent;

generating by said trading agent a trade based upon said trading commitment; and receiving by said trading agent a trading revenue based at least in part upon said trade.

28. The method of claim 27, further comprising the step of:

interacting by said trading agent with said second server, further including at least one member of the collection comprising the steps of:

said trading agent working for a trading firm owning said second server; said trading agent working for said trading firm controlling said second server;

said trading agent working for said trading firm managing said second server; and said trading agent subscribing with said trading firm to receive said trading commitment from said second server; and said trading firm receiving a firm revenue based at least in part upon said trade.

29. The method of claim 1, wherein at least one of the steps is implemented using at least one instance of a member of a computer language collection including a script language, a natural language, a logic programming language, and an interpreted language.

30. The method of claim 1, wherein said web view is further comprised of:

means for said client interface presenting to said client a second of said transactions as a second of said corresponding item presentations in terms of said transaction detail; and means for said client interface further developing said transaction detail for said second transaction based upon said second corresponding item presentation and based upon at least one of said client cues.

31. The method of claim 1, wherein the means for said client interface presenting is further comprised of the step of:

means for presenting a second of said transactions as a second of said corresponding item presentations based upon said transaction detail; and wherein the means for responding is further comprised of the step of:

means for responding to said client cue further based upon said second corresponding item presentation to further develop said transaction detail for said second transaction.

32. The method of claim 1, wherein said corresponding item presentation includes at least one member of an item presentation type collection comprising:
   a visual item presentation, an auditory item presentation, an olfactory item presentation, a tactile item presentation, a taste item presentation, and a virtual item presentation.

33. The method of claim 32, wherein said visual item presentation includes at least one member of the collection comprising a two-dimensional visual item presentation, a three-dimensional visual item presentation, and a moving-visual item presentation; and wherein said virtual item presentation includes at least two member of the remaining of said item presentation type collection members.

34. The method of claim 1, wherein said client cue includes at least one instance of a client cue primitive collection member; wherein said client cue primitive collection is comprised of a client pointing device event, a client hand motion event, a client keyboard event, a client speech event, a client eye motion event, and a client body event.

35. The method of claim 34, wherein said client pointing device event includes a client mouse event, a client tablet event, a client track ball event, a client game interface event, a client touch screen event, and a client touch pad event; wherein said client hand motion event includes a client sign language event, and a client hand pointing event; and wherein said client speech event includes a recognition event of an auditory pattern from said client.

36. The method of claim 1, wherein the means for sending said transaction detail to said second server via said first server is further comprised of means for a web browser sending said transaction detail to said second server via said first server.

37. The method of claim 1, wherein the means for responding to said client cue is further comprised of: means for collecting a traffic item directed to said first server from a web page, when said web page does not request a web navigation; and means for integrating said traffic item into said transaction detail.

38. The method of claim 1, wherein said transaction detail is a data component accessible by a web browser operating said client interface.

39. The method of claim 38, wherein said data component includes at least part of at least one member of the collection comprising: a memory, a file, a database, a cookie, a spreadsheet, a document, a folder, a directory, and an inferential graph.

40. The method of claim 1, further comprising the step of:
   generating said web view, comprising the steps of:
   generating said means for said client interface presenting to said client at least one transaction as a corresponding item presentation in terms of a transaction detail;
   generating said means for said client interface developing said transaction detail for said transaction based upon said corresponding item presentation and based upon at least one cue from said client; and
   generating at least one of said means for said client interface using at least one navigation activator based upon at least one of said client cues.

41. A method processing a business transaction for a client by a client interface communicating with a first server using a web view, comprising the steps of: interactively presenting said web view to said client to create a transaction detail without further requiring communication with said first server, further comprising the steps of:
   presenting at least one transaction as a corresponding item presentation based upon said transaction detail;
   responding to a client cue based upon said corresponding item presentation to develop said transaction detail for said transaction;
   using at least one navigation activator based upon said client cue from said client to communicate said transaction detail with a second server via said first server, further comprising the step of:
   sending said transaction detail to said second server via said first server before requesting a web navigation based upon said client cue, wherein said web view includes said corresponding item presentation.

42. The method of claim 41, wherein said first server is the same as said second server.

43. The method of claim 41, wherein said transaction includes a purchase involving a quantity of an item, wherein said corresponding item presentation includes a designation of said item and a designation of said quantity, wherein said second server maintains a shopping cart, including a shopping item, using said transaction detail for said client accessing said first server; and further comprising the steps of:
   presenting to said client a price for said purchase of said quantity of said item to create a presented price;
   supporting said second server creating a price code included in said shopping item, via said fast server; and
   providing by said client at least one of said cues to trigger said second server receiving a commitment to pay for said purchase of said quantity of said item at said presented price via said first server to create a client commitment.

44. The method of claim 43, wherein the step of presenting to said client said price is further comprised of a member of the collection comprising the steps of:
   providing by said client interface a price indication to said client to create said presented price, wherein said price indication included in said transaction item; and
   arriving by said presented price at said client interface from said second server via said first server and presented to said client for said purchase.

45. The method of claim 41, wherein the step requesting said web navigation is further comprised of at least one member of the collection comprising the steps of:
   requesting a previously viewed web view;
   requesting a new web view;
   requesting a reloading of said web view; and
   requesting at least one content item to alter said web view.

46. The method of claim 41, wherein said transaction includes at least one participant for an event described by at least one event descriptor, wherein said event descriptor includes at least one member of the collection comprising a location, a phone number, a conference call center, a time period, a room reservation, a site reservation, a drink order, and a food order, wherein said event includes at least one member of a collection including a meeting, a multi-site meeting, a distant conference, and a vacation.

47. The method of claim 46, further comprising at least one member of the collection comprising the steps of:
   receiving a drink delivery agreement from said second server with a catering merchant for said drink order in said time period at said location costing a drink price;
   receiving a food delivery agreement from said second server with said catering merchant for said food order in said time period at said location costing a food price; and
   receiving a food-drink delivery agreement from said second server with a catering merchant for said drink order and for said food order in said time period at said location costing a food-drink price; wherein a delivery agreement collection is comprised of said drink delivery agreement, said food delivery agreement, and said food-drink delivery agreement.

48. The method of claim 46, further comprising at least one member of the collection comprising the steps of:
receiving from said second server a room reservation agreement for said room reservation with a room provider;
receiving from said second server a site reservation agreement for said site reservation with a site provider; and
receiving from said second server a transport reservation agreement regarding said location and said time period with a transport facilitator.

49. The method of claim 41, wherein said transaction includes at least one financial action for an account for an amount; wherein said financial action is a member of a financial action collection comprising a deposit, a withdrawal, and a fee; wherein said method is further comprised of the step of receiving by said client a benefit of a financial service performed by a financial institution based upon said transaction detail received by said second server.

50. The method of claim 41, wherein said transaction detail includes a trading action of a commodity for a quantity meeting a trading condition, wherein each of said trading actions included in said transaction detail reflects a transaction, wherein said trading action is a member of a trading action collection including a buy-order and a sell-order, wherein said trading condition, when said trading action is said buy-order, includes a maximum-price; and wherein said trading condition, when said trading action is said sell-order, includes a minimum-price, wherein said method is further comprised of the step of: said client receiving a benefit of a trade generated based upon said transaction detail received by said second server; wherein said trade benefit is a member of the trade benefit collection including a sell-profit based upon said trade, a buy-acquisition based upon said trade, and a declared tax loss based upon said trade.

51. The method of claim 41, further comprising the step of receiving said web view from said first server.

52. The method of claim 41, wherein the step interactively presenting is further comprised of the step of:
presenting a second of said transactions as a second of said corresponding item presentations based upon said transaction detail; and
wherein the step of responding is further comprised of the step of responding to said client cue further based upon said second corresponding item presentation to further develop said transaction detail for said second transaction.

53. The method of claim 41, wherein a web browser is used to interactively present said web view to create said transaction detail and is used to send said transaction detail to said second server when said web navigation is requested to implement said method.

54. The method of claim 41, further comprising the steps of:
providing an implementation comprising at least one member of the collection comprising the steps of:
integrating by a client interface manufacturer means (2002) for interactively presenting said web view to said client to create said transaction detail and means (2102) for using said at least one navigation activator based upon said cue from said client to communicate said transaction detail with said second server via said first server into said client interface to receive a client interface manufacturing revenue;
selling by a client interface supplier said client interface to said client in order to receive a client interface supplier revenue;
providing by a client service provider a web browser implementing said steps to said client for use on said client interface to receive a client service provider revenue; and
providing by a client software package provider a software package to said client for use on said client interface to receive a client software package provider revenue; wherein said software package includes means for (2002) and (2102) implementing said steps.

55. The method of claim 54, wherein said client based revenue collection includes said client interface manufacturing revenue, said client interface supplier revenue, said client service provider revenue, and said client software package provider revenue.

56. The method of claim 41, wherein said corresponding item presentation includes at least one member of an item presentation type collection comprising: a visual item presentation, an auditory item presentation, an olfactory item presentation, a tactile item presentation, a taste item presentation, and a virtual item presentation, wherein said visual item presentation includes at least one member of the collection comprising a two-dimensional visual item presentation, a three-dimensional visual item presentation, and a moving-visual item presentation, wherein said virtual item presentation includes at least two members of the remaining of said item presentation type collection members, wherein said client cue includes at least one instance of a client cue primitive collection member comprised of a client pointing device event, a client hand motion event, a client keyboard event, a client speech event, a client eye motion event, and a client body event; wherein said client pointing device event includes a client mouse event, a client tablet event, a client track ball event, a client game interface event, a client touch screen event, and a client touch pad event, wherein said client hand motion event includes a client sign language event, and a client hand pointing event; and wherein said client speech event includes a recognition event of an auditory pattern from said client.

57. The method of claim 41, wherein the step sending said transaction detail to said second server via said first server is further comprised of the step of sending by said web view said transaction detail to said second server via said first server.

58. The method of claim 41, wherein the step of responding to said client cue is further comprised of the steps of:
collecting a traffic item directed to said first server from a web view, when said web view does not request a web navigation; and
integrating said traffic item into said transaction detail.

59. The method of claim 41, wherein said transaction detail is a data component accessible by said web view, wherein said data component includes at least part of at least one member of the collection comprising: a memory, a file, a database, a cookie, a spreadsheet, a document, a folder, a directory, and an inferential graph.

60. The method of claim 41, wherein said client interface includes at least one client interface computer executing at least one client interface program system comprised of program steps residing in a client interface memory accessibly coupled to said client interface computer, and wherein at least one of said steps comprising said method is at least partially implemented as at least one of said program steps.

61. The method of claim 60, wherein each of said steps comprising said method is at least partly implemented as at least one of said program steps.

62. The method of claim 60, wherein said client interface computer includes at least one instance of a member of the collection comprising an instruction processor, an inferential engine, a neural network, and a finite state machine, wherein said instruction processor is comprised of at least one data execution unit controlled by at least one instruction handler responding to said program steps to control said data execution unit to at least partly implement said steps; wherein said inferential engine responds to said program steps as nodes and transitions within an inferential graph based upon and modifying a inference database to at least partly implement said steps, wherein said neural network responds to said program steps as stimulus to at least partly implement said steps, and wherein said finite state machine responds to said program steps as at least one member of a finite state collection comprising a state and a state transition, to implement at least part of said steps.

63. The method of claim 46, wherein said client interface memory includes at least one instance of at least one member of a memory type collection comprising: a non-volatile memory, and a volatile memory; wherein said non-volatile memory includes at least one memory state retained without applying a power source to said non-volatile memory; and a volatile memory includes at least one memory state lost without applying said power source to said volatile memory.

64. The method of claim 41, wherein at least one of the steps is implemented using at least one instance of a member of the computer language collection including a script language, a natural language, a logic programming language, and an interpreted language.

65. The method of claim 41 comprising the step of:
generating said web view, comprising the steps of:
generating a means for said client interface presenting to said client at least one transaction as a corresponding item presentation in terms of a transaction detail;
generating a means for said client interface developing said transaction detail for said transaction based upon said corresponding item presentation and based upon at least one cue from said client; and
generating at least one of said means for said client interface using at least one navigation activator based upon at least one of said client cues.

66. The method of claim 41, further comprising the step of:
making by a web developer, means (2002) for interactively presenting said web view to said client to create said transaction detail and means (2102) for using said at least one navigation activator based upon said cue from said client to communicate said transaction detail with said second server via said first server, further comprising the steps:
creating by said web developer a source means for said steps (2002) and (2102);
operating by said web developer a source translator toolkit receiving said source means to create said means (2002) and (2102) provided to said web developer.

67. The method of claim 66, further comprising the step of:
using by said web developer said means (2002) and (2102) for business comprising at least one member of the collection comprising the steps of:
providing by said web developer said means (2002) and (2102) to a client software package provider to induce a first developer revenue being sent to said web developer;
providing by said web developer said means (2002) and (2102) to a client service provider to induce a second developer revenue being sent to said web developer; and
providing by said web developer a plug-in containing said means (2002) and (2102) to said client to induce a third developer revenue being sent to said web developer.

* * * * *